US007621124B2

(12) United States Patent
Mizoguchi et al.

(10) Patent No.: US 7,621,124 B2

(45) Date of Patent: Nov. 24, 2009

(54) TRAVEL VIBRATION SUPPRESSING DEVICE FOR WORKING VEHICLE

(75) Inventors: Norihide Mizoguchi, Tochigi (JP); Hisashi Asada, Tochigi (JP); Daisuke Kozuka, Tochigi (JP); Kazunori Ikei, Tochigi (JP); Shuuji Hori, Tochigi (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 10/575,000

(22) PCT Filed: Oct. 7, 2004

(86) PCT No.: PCT/JP2004/014827

§ 371 (c)(1),
(2), (4) Date: Apr. 7, 2006

(87) PCT Pub. No.: WO2005/035883

PCT Pub. Date: Apr. 21, 2005

(65) Prior Publication Data

US 2007/0056277 A1 Mar. 15, 2007

(30) Foreign Application Priority Data

Oct. 10, 2003 (JP) ............................ 2003-351449

(51) Int. Cl.
*F16D 31/02* (2006.01)

(52) U.S. Cl. ........................................................ 60/469

(58) Field of Classification Search .................. 60/412, 60/469, 413
See application file for complete search history.

(56) References Cited

U.S. PATENT DOCUMENTS

| | | | | |
|---|---|---|---|---|
| 4,995,517 | A * | 2/1991 | Saotome | 60/413 |
| 5,733,095 | A * | 3/1998 | Palmer et al. | 60/413 |
| 5,752,546 | A * | 5/1998 | Yamashita | 91/446 |
| 5,802,847 | A | 9/1998 | Harnischfeger | |
| 6,351,944 | B1 * | 3/2002 | Fertig et al. | 60/413 |

FOREIGN PATENT DOCUMENTS

| | | |
|---|---|---|
| JP | 63-034304 | 2/1988 |
| JP | 06-330535 | 11/1994 |
| JP | 08-277548 | 10/1996 |
| JP | 9-512869 | 12/1997 |
| JP | 10-274271 | 10/1998 |
| JP | 2001-200804 | 7/2001 |

* cited by examiner

*Primary Examiner*—F. Daniel Lopez
(74) *Attorney, Agent, or Firm*—Fish & Richardson P.C.

(57) ABSTRACT

A travel vibration suppressing device 20 is structured such that a directional control valve 30 for a bucket, a directional control valve 29 for a boom, a ride control valve 31 and a boom speed increasing valve 33 are integrally arranged in a laminated manner by an internal piping. The ride control valve 31 communicates or cuts off a bottom chamber 11*a* of a boom cylinder 11 and an accumulator 27. The boom speed increasing valve 33 supplies a discharge pressure of a hydraulic pump 21 to the bottom chamber 11*a* or a head chamber 11*b* or connects the to the bottom chamber 11*a* or the head chamber 11*b* to a tank 23.

8 Claims, 14 Drawing Sheets

TRAVEL VIBRATION SUPPRESSING DEVICE FOR WORKING VEHICLE

TECHNICAL FIELD

The present invention relates to a travel vibration suppressing device of a working vehicle, and more particularly to a travel vibration suppressing device for executing a vibration reduction of a vehicle body by suppressing a pressure pulsation in a working apparatus at a time of traveling by an accumulator, in a working vehicle to which a working apparatus is installed.

BACKGROUND ART

Conventionally, in a wheel loader of a example of the working vehicle, a vehicle main body is provided with a boom attached to the vehicle main body so as to move up and down, a working member such as a bucket or the like rotatably attached to the boom, and a working apparatus comprises a boom cylinder and a bucket cylinder respectively actuating the boom and the working member. Sediment is excavated, conveyed and loaded by actuating the boom and the working member.

In the wheel loader, in order to suppress a pressure pulsation and reduce vibration of a vehicle body for improving a ride quality and preventing a load collapse in the working apparatus at a time of traveling, for example, there is proposed a dynamic damper of a working vehicle shown in a patent document 1. As shown in FIG. 14, the dynamic damper of the working vehicle is structured as follows.

An elevating cylinder (hereinafter, referred to as a boom cylinder 112) is expanded and contracted by receiving pressure oil of a hydraulic pump 117 by a control valve 119, thereby moving the boom up and down. The control valve 119 is connected to a head side oil chamber 126 of the boom cylinder 112 via a piping 127, and is connected to a bottom side oil chamber 128 via a piping 129.

The piping 127 and the piping 129 connect a branch piping 130 and a branch piping 131 which are respectively branched in a middle of a pipe passages. The branch piping 130 is connected to an oil tank 116 via a switching valve 133. The branch piping 131 is connected to an accumulator 162 via a switching valve 133 and a variable throttle apparatus 161. The switching valve 133 is structured by an electromagnetic valve, urged by a spring when it is excited so as to be switched to a cutoff position, and switched to a connected position when it is not excited.

The variable throttle apparatus 161 is constituted by a throttle apparatus which can regulate a throttle opening degree in a plurality of stages, and comprises a plurality of throttles 164 and 165 and a throttle selecting switching valve 166. The switching valve 166 is constituted by an electromagnetic valve, and urged by the spring when it is not excited so as to be switched to a position selecting the throttle 164 having a large throttle opening degree. The switching valve 133 and the switching valve 166 are controlled by a controller 153.

A pressure sensor 149 connected to the piping 129 detects a pressure in a bottom side oil chamber 128. The controller 153 excites a coil in the switching valve 133 so as to switch to the connected position, at a time when the pressure in the bottom side oil chamber 128 detected by the pressure sensor 149 is within a range which is equal to or more than a minimum allowable pressure of the accumulator and equal to or less than a maximum allowable pressure. Further, the controller 153 selects a position of the switching valve 166 depending on the pressure detected by the pressure sensor 149, at a time when the pressure detected by the pressure sensor 149 is equal to or more than a set pressure.

The set pressure is set as follows. A proper set mass between a minimum mass of the installed working apparatus and a maximum mass of the working apparatus including a loaded material is assumed. For example, a mass which is one half of a sum of the minimum mass and the maximum mass is set to the set mass. On an assumption that the mass of the working apparatus is the assumed fixed mass, when the control valve 119 is at a neutral position, the pressure in the bottom side oil chamber 128 of the boom cylinder 112 at this time is defined as the set pressure.

In the structure mentioned above, the dynamic damper is actuated by turning on a changing switch 155 as well as setting the control valve 119 at the neutral position. Accordingly, it is possible to prevent a vibration such as a pitching, a bouncing or the like of the vehicle main body at a time of traveling of the wheel loader.

The wheel loader is traveled in a state in which the dynamic damper is actuated. At this time, the working apparatus is vibrated in response to a condition of a road surface, an acceleration and deceleration of the vehicle or the like, and the boom is going to oscillate in a vertical direction in correspondence thereto. Accordingly, a pressure fluctuation is generated within the oil chamber 128 in a bottom side of the boom cylinder 112 holding the boom.

The pressure within the bottom side oil chamber 128 at this time is detected by a pressure sensor 149. When the detected pressure is within a range equal to or more than the minimum allowable pressure of the accumulator 162 and equal to or less than the maximum allowable pressure, the controller 153 changes the switching valve 133 to the connected position.

In the case that the mass of the working apparatus is smaller than the set mass mentioned above, and the pressure within the bottom side oil chamber 128 is lower than the set pressure, the bottom side oil chamber 128 and the accumulator 162 are connected via the throttle 164 having a large throttle opening degree, due to the change of the switching valve 166. In a case that the mass of the working apparatus is equal to or larger than the set mass, and the pressure within the bottom side oil chamber 128 is equal to or higher than the set pressure, the bottom side oil chamber 128 and the accumulator 162 are connected via the throttle 165 having a small throttle opening degree due to the change of the switching valve 166.

Accordingly, even if the mass of the working apparatus is changed and a vibration characteristic is changed, it is possible to effectively suppress the vibration such as the pitching, the bouncing or the like of the vehicle main body by an actuation of the dynamic damper.

Patent Document 1: Japanese application laid-open publication No. 2001-200804

DISCLOSURE OF THE INVENTION

Problem to be Solved by the Invention

In the dynamic damper of the working vehicle in the patent document 1, it is necessary to employ two electromagnetic valves comprising the switching valve 133 for selecting the dynamic damper, and the switching valve 166 for selecting the throttle. Further, since the switching valve 133 is independently arranged at a position apart from the control valve 119, it is necessary to arrange the branch pipings 130 and 131 which are respectively branched from the pipings 127 and 129 for connecting the control valve 119 and the boom cylinder 112.

Accordingly, a number of the piping is increased, and a space for the piping is increased so as to make it hard to secure a space for arranging the piping. Further, since the switching valve requires two electromagnetic valves and a plurality of throttles, a number of parts is increased, and an increase of a cost is caused.

If the changing switch 155 is turned on at a time when the wheel loader travels, the bottom side oil chamber 128 of the boom cylinder 112 is connected to the accumulator 162 via the switching valve 133 and the switching valve 166. At this time, in a case that a total of the mass of the working apparatus and the mass of the loaded material is largely remote from the mass assumed at a time of defining the set pressure of the accumulator 162, it is impossible to effectively actuate the dynamic damper.

For example, in a case that the pressure in the accumulator 162 is higher than the pressure within the bottom side oil chamber 128, the pressure in the accumulator 162 corresponding to a high pressure side is rapidly supplied to the bottom side oil chamber 128 corresponding to a low pressure side. Accordingly, the boom cylinder 112 is expanded, and the boom is rapidly moved upward.

In a case that the pressure in the accumulator 162 is lower than the pressure in the bottom side oil chamber 128, the pressure in the bottom side oil chamber 128 corresponding to the high pressure side is rapidly supplied to the accumulator 162 corresponding to the low pressure side. At this time, the boom cylinder 112 is rapidly contracted, and the boom is rapidly moved downward. As mentioned above, there is generated a behavior of the boom which can not be expected by an operator.

Further, when the working vehicle runs on a stone or the like during the travel, an instantaneous flow rate flowing out from the boom cylinder 112 is rapidly increased. In order to circulate a large instantaneous flow rate generated at this time, it is desired to be provided with a pressure apparatus having a low pressure loss in the travel vibration suppressing device. Further, in order to reduce an impact on the working apparatus at a time when the vibration is generated, a good response characteristic is required in the travel vibration suppressing device.

In the travel vibration suppressing device, there is required a structure in which the changing valve has an opening area which can sufficiently correspond to a large pressure fluctuation width in the bottom side oil chamber generated due to the load mass of the working member, or a structure which can easily change the set pressure of the actuator over a wide range, or the like.

In particular, the following structures are desired in the travel vibration suppressing device in the wheel loader or the like. For example, it is desired that the accumulator rapidly absorbs the pressure oil from the bottom side oil chamber with a good response so as to suppress an upward movement of the boom when the boom is thrown up, and that the accumulator slowly supplies the pressure oil to the bottom side oil chamber so as to suppress a downward movement of the boom and suppress the vibration of the boom in a short time when the boom is moved downward.

The present invention is made by taking the problems mentioned above into consideration, and an object of the present invention is to provide a travel vibration suppressing device which is provided with a directional control valve for controlling an actuator of a working apparatus equipped in a working vehicle, and a ride control valve for connecting an accumulator and the actuator, and which can suppress a pressure pulsation in the actuator by a simple structure and with a good response, and can reduce a vibration in a vehicle body.

Means for Solving the Problem

In order to achieve the object, according to the present invention, there is provided a travel vibration suppressing device disposed in a working vehicle, the travel vibration suppressing device absorbing a pressure pulsation generated in an actuator when the working vehicle is traveling, and comprising: a hydraulic pump; at least one actuator actuated by pressure oil discharged from the hydraulic pump; an accumulator connected to one pressure chamber in the at least one actuator for absorbing a pressure pulsation generated in the pressure chamber; a directional control valve for controlling a supply and a discharge of the pressure oil to the actuator; and a ride control valve for switching a communicating state and a cutoff state between the accumulator and the pressure chamber, wherein the ride control valve is constructed in a ride valve body, the directional control valve is constructed in a bucket valve body, the ride valve body is disposed on the bucket valve body in a laminated manner, the ride control valve and the directional control valve are connected through an internal piping in the ride valve body and the bucket valve body, the travel vibration suppressing device comprises a first pressure sensor for detecting a load pressure of the actuator and a communication opening area of the ride control valve which communicates between the accumulator and the pressure chamber is controlled on a basis of a detected signal from the first pressure sensor.

Further, in accordance with major characteristics of the present invention, a communication opening area of the ride control valve is controlled by using a pressure sensor for detecting a load pressure of the actuator, and a travel state detecting sensor for detecting a travel state of the working vehicle, a condition at a time of communicating the accumulator and the actuator is set by using a pressure sensor for detecting a pressure of the accumulator, an opening area of an upper limit which can be increased the communication opening area of the ride control valve is controlled, a speed increasing valve body comprising a speed increasing valve is disposed on a ride valve body comprising a ride control valve or a bucket valve body comprising a directional control valve in a laminated manner.

EFFECT OF THE INVENTION

In accordance with the present invention, the directional control valve for the actuator and the ride control valve are arranged in a layered manner by the internal piping. Accordingly, in a mating surface between the directional control valve and the ride control valve, oil path for connecting both the valves can be communicated, and the travel vibration suppressing device can be compact. Further, an external piping from the directional control valve to the actuator and the accumulator is constituted by the piping for connecting the directional control valve and the actuator and the piping for connecting the ride control valve and the accumulator.

Accordingly, it is possible to reduce a number of the piping arranged for arranging the external piping, and to shorten a length of the piping used for the external piping. Since the number of the external piping is reduced and the length of the piping becomes short, it is possible to reduce a space necessary for arranging the external piping. Further, an attaching work of the external piping is easily executed.

Since it is possible to reduce a pressure loss within the piping due to the internal piping, and it is possible to secure a diameter of a flow path through which a large amount of instantaneous flow rate is circulated, a response of the ride control valve is improved. Further, an excessive impact pressure is applied to the accumulator at a reduced possibility, and a durability of the accumulator is improved.

Accordingly, it is possible to effectively suppress the vibration such as the pitching, the bouncing or the like of the vehicle main body at a time when the vibration is generated. Further, the ride control valve can be structured such that it is possible to execute a supply of the pressure oil to the accumulator, and the communication or the cutoff between the accumulator and the actuator, by one spool. Since the travel vibration suppressing device can be structured by a simple structure, it is possible to reduce the number of the parts for constructing the travel vibration suppressing device, and to inexpensively structure the travel vibration suppressing device.

In accordance with the present invention, it is possible to control the communication opening area of the ride control valve on the basis of the detection signal from the pressure sensor and/or the travel state detecting sensor. For example, when the boom equipped in the working vehicle is moved upward on the basis of the vibration generated at a time when the working vehicle travels, it is possible to execute such a control as to widen the communication opening area and to rapidly absorb the pressure oil which becomes high pressure from the bottom chamber of the actuator by the accumulator, thereby suppress a rapid upward movement of the boom.

Further, in a case that the boom is moved downward due to the vibration generated at a time when the working vehicle travels, it is possible to execute a control to narrow the communication opening area, and to reduce the pressure oil supplied to the actuator from the accumulator so as to supply less, thereby slowly move the boom downward. As mentioned above, it is possible to suppress the pressure pulsation of the actuator caused by the vibration generated at a time when the working vehicle travels in a short time.

In accordance with the present invention, when the pressure within the accumulator is higher than the load pressure of the actuator, it is possible to connect the accumulator and the actuator after previously reducing the pressure within the accumulator to the load pressure of the actuator instead of connecting the accumulator and the actuator as they are.

Accordingly, it is possible to prevent the boom from being rapidly moved upward by the pressure from the accumulator, for example, because the pressure within the accumulator is higher than the load pressure in the actuator, at a time of connecting the accumulator and the actuator.

In accordance with the present invention, when an operation for increasing the communication opening area is performed, a valve of an upper limit of an area which can be increased as the communication opening area can be controlled. With regard to the valve of the upper limit, it is possible to control the value of the upper limit depending on the load pressure of the actuator and/or the traveling speed of the working vehicle.

For example, in a case that the load pressure of the actuator generated by the load mass of the working member is high, or in a case that the traveling speed of the working vehicle is high, it is possible to make the upper limit opening area openable as the communication opening area small. Accordingly, it is possible to prevent an excessive impact pressure from being applied to the accumulator so as to improve a durability of the accumulator.

For example, in a case that the load pressure of the actuator generated by the load mass of the working member is low, or in a case that the traveling speed of the working vehicle is low, it is possible to make the upper limit opening area openable as the communication opening area large. Accordingly, it is possible to improve a response of the accumulator with respect to the pressure pulsation of the actuator.

As mentioned above, it is possible to obtain the travel vibration suppressing device matching to the load pressure of the actuator and/or the traveling state of the working vehicle. Further, the actuator is not unexpectedly expanded and contracted due to the pressure from the accumulator as is the case in a conventional structure, and an operability in the working vehicle is improved.

In accordance with the present invention, it is possible to arrange the speed increasing valve in a laminated manner in adjacent to the directional control valve or the ride control valve. It is possible to circulate a supply flow rate and a discharge flow rate with respect to the actuator from the speed increasing valve disposed in a laminated manner. Since it is possible to alternatively control part of the flow rate of the pressure oil supplied to and discharged from the actuator by the speed increasing valve, it is possible to mount the travel vibration suppressing device in accordance with the present invention on middle-scaled and large-scaled working vehicles, so as to achieve an excellent vibration suppressing effect.

According to the present invention, there is provided a travel vibration suppressing device disposed in a working vehicle, the travel vibration suppressing device absorbing a pressure pulsation generated in an actuator when the working vehicle is traveling, and comprising: a hydraulic pump; at least one actuator actuated by pressure oil discharged from the hydraulic pump; an accumulator connected to one pressure chamber in the at least one actuator for absorbing a pressure pulsation generated in the pressure chamber; a directional control valve for controlling a supply and a discharge of the pressure oil to the actuator; and a ride control valve for switching a communicating state and a cutoff state between the accumulator and the pressure chamber, wherein the ride control valve is constructed in a ride valve body, the directional control valve is constructed in a bucket valve body, the ride valve body is disposed on the bucket valve body in a laminated manner, the ride control valve and the directional control valve are connected through an internal piping in the ride valve body and the bucket valve body, the travel vibration suppressing device comprises a speed increasing valve for increasing a supply amount of the pressure oil from the hydraulic pump to the actuator, the speed increasing valve is constructed in a speed increasing valve body, and the speed increasing valve body is disposed on the ride valve body or the bucket valve body in a laminated manner, the speed increasing valve and the ride control valve or the directional control valve are connected through the internal piping in each body and/or an external piping outside of each body.

DESCRIPTION OF REFERENCE NUMERALS

Figure 1:
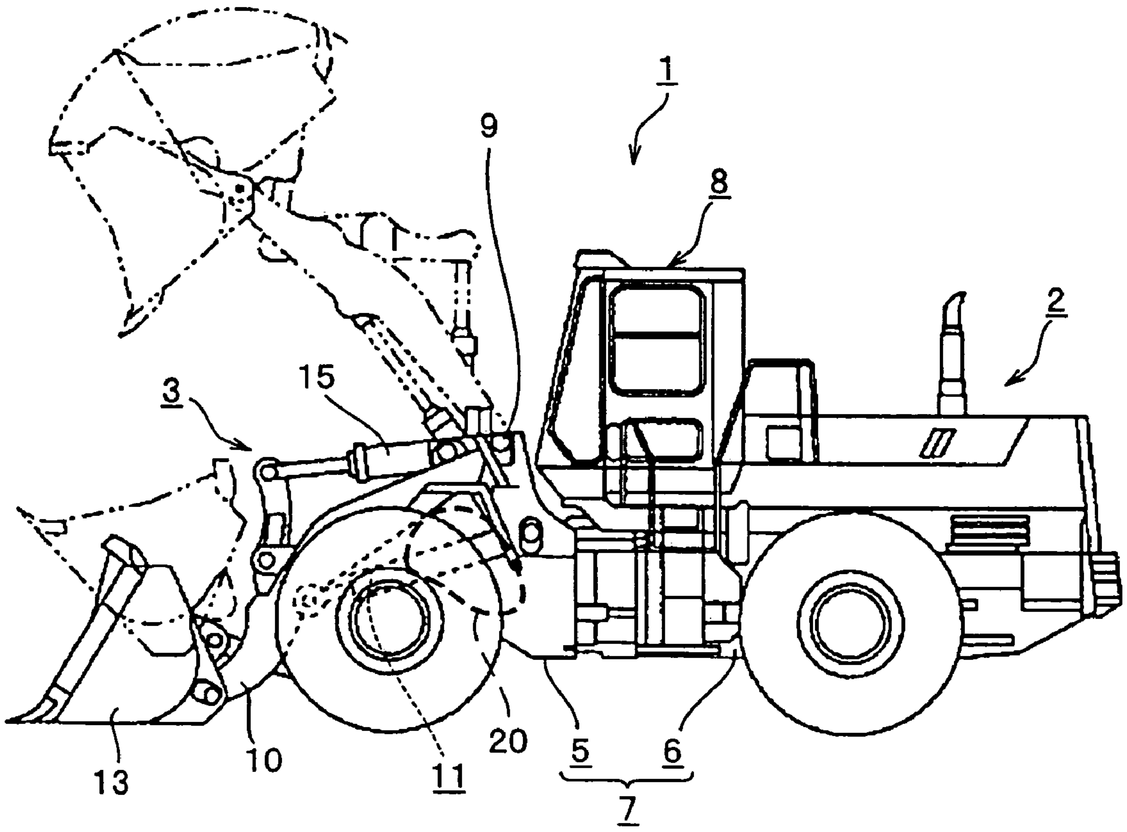
FIG. 1 is a side elevational schematic view of a wheel loader using a travel vibration suppressing device in accordance with the present invention.

1 wheel loader
2 vehicle main body
3 working apparatus
10 boom
11 boom cylinder (actuator for boom)
13 bucket
15 bucket cylinder
20, 20A, 20B, 20C travel vibration suppressing device
21 hydraulic pump
23 tank
25 directional control valve
27 accumulator
29 directional control valve for boom (directional control valve for boom)
30 directional control valve for bucket
31, 31A, 31B ride control valve
33 boom speed increasing valve
56 control portion for ride valve
56*a* control chamber
56*b* proportional control valve
57, 57*a*, 57*b*, 57*c* controller
61 piping for supply fluid
62 piping for return
63 oil path for tank
67 piping for pump
73 piping
81 pressure sensor for boom
82 pressure sensor for accumulator
84 travel state detecting sensor
86 variable throttle
88 variable throttle valve
90 first proportional control valve
W1 to W3 mating face

BEST FOR CARRYING OUT THE INVENTION

A description of an embodiment of a travel vibration suppressing device in accordance with the present invention will be given below with reference to the accompanying drawings. A description will be given by exemplifying a wheel loader as a working vehicle on which a travel vibration suppressing device is mounted, however, the working vehicle which can mount the travel vibration suppressing device in accordance with the present invention thereon is not limited to the wheel loader. As far a pressure pulsation is generated in an actuator of the working apparatus during a travel of the working vehicle, the travel vibration suppressing device in accordance with the present invention can be mounted as an apparatus for suppressing the pressure pulsation on the working vehicle. Accordingly, the travel vibration suppressing device is not limited to the structure described below, but can be variously modified.

In FIG. 1, a wheel loader 1 comprises a vehicle main body 2 and a working apparatus 3 attached to a front portion of the vehicle main body 2. The vehicle main body 2 comprises a vehicle body 7 having a front frame 5, a rear frame 6 or the like and a cabin 8 or the like.

The working apparatus 3 comprises a pair of right and left booms 10 pivoted by a pivot shaft 9 of the front frame 5 so as to move up and down, a pair of right and left boom cylinders 11 interposed between the front frame 5 and each of the booms 10 and moving the boom 10 up and down, a bucket 13 rotatably pivoted to each of front end portions of a pair of booms 10, a bucket cylinder 15 interposed between the front frame 5 and the bucket 13 and rotating the bucket 13, and the like. The travel vibration suppressing device 20 is arranged at a position surrounded by a dashed line on the front frame 5 side. The boom cylinder 11 is constituted as one of actuators actuated by the pressure oil supplied from the hydraulic pump 21.

First Embodiment

Figure 2:
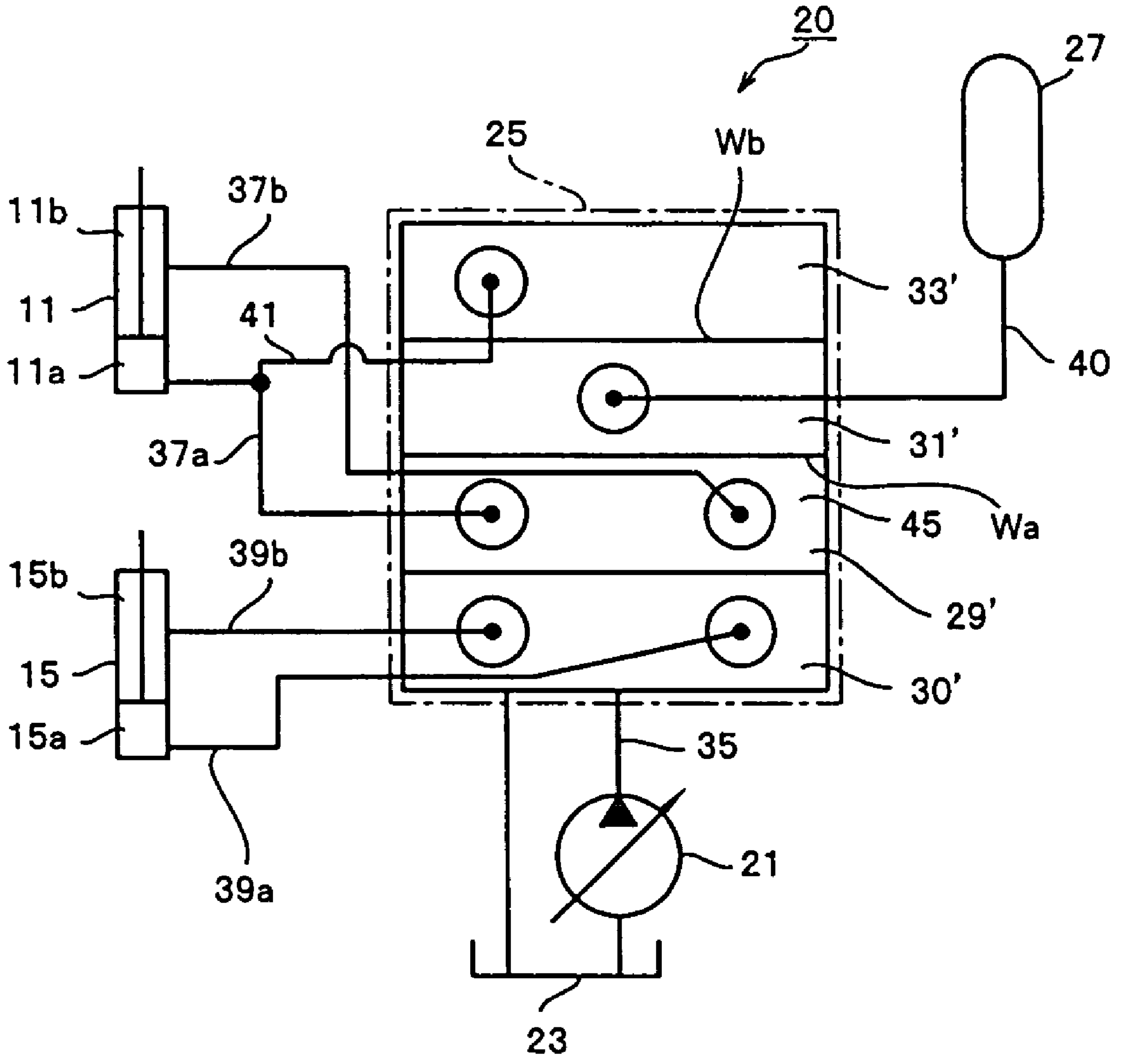
FIG. 2 is a structural view of the travel vibration suppressing device.

As shown in FIG. 2 corresponding to a schematic view of the travel vibration suppressing device 20, there are arranged in a laminated manner a directional control valve body 30' for the bucket (hereinafter, refer to as a bucket valve body 30'), a directional control valve body 29' for the boom (hereinafter, refer to as a boom valve body 29'), a ride control valve body 31' (hereinafter, refer to as a ride valve body 31') and a boom speed increasing valve body 33' (hereinafter, refer to as a speed increasing valve body 33') by an internal piping within a body, and they are structured as one block body 25. A description of the travel vibration suppressing device 20 will be given below by using the travel vibration suppressing device 20 in which four valve bodies mentioned above are structured as one block body 25.

A description of the travel vibration suppressing device 20 in which a directional control valve 30 for the bucket (hereinafter, refer to as a bucket valve 30) and a boom speed increasing valve 33 (hereinafter, refer to as a speed increasing valve 33) are arranged in a laminated manner will be given below. However, arranging the bucket valve 30 and the speed increasing valve 33 in a laminated manner is not necessarily required for the travel vibration suppressing device 20. The structure in which at least a directional control valve 29 for the boom (hereinafter, refer to as a boom valve 29) and a ride control valve 31 (hereinafter, refer to a ride valve 31) are arranged in a laminated manner is a necessary structure for the travel vibration suppressing device 20.

As shown in FIG. 2, a hydraulic pump 21 feeds oil sucked from a tank 23 as a discharge pressure oil to the block body 25. The bucket valve 30 (refer to FIG. 3) within the bucket valve body 30' is switched by a pilot pressure (not shown), and supplies the discharge pressure oil from the hydraulic pump 21 to the bucket cylinder 15 so as to execute an actuation control of the bucket cylinder 15. Further, the boom valve 29 (refer to FIG. 3) within the boom valve body 29' is switched by a pilot pressure (not shown), and supplies the discharge pressure oil from the hydraulic pump 21 to the boom cylinder 11 so as to execute an actuation control of the boom cylinder 11.

The ride valve 31 (refer to FIG. 3) within the ride valve body 31' is switched by a pilot pressure (not shown), and executes a connection and a cutoff between the boom cylinder 11 and the accumulator 27. Accordingly, it is possible to suppress the pressure pulsation of the boom cylinder 11 generated by receiving a vibration of the vehicle body 7 at a time of traveling, by the accumulator 27.

The speed increasing valve 33 (refer to FIG. 3) within the speed increasing valve body 33' is switched by a pilot pressure (not shown), can increase a diameter of a flow path connecting the boom cylinder 11 and the accumulator 27, and can increase a diameter of a flow path connecting the boom cylinder 11 and the tank 23.

A description of a pressure circuit of the travel vibration suppressing device 20 will be given with reference to FIG. 3. The travel vibration suppressing device 20 is structured such that the boom valve 29, the bucket valve 30, the ride valve 31 and the speed increasing valve 33 are integrally arranged in a laminated manner. In this case, in FIG. 3, the tank 23 is described within the travel vibration suppressing device 20, by which the pressure circuit can be easily seen by omitting a connection piping to the tank 23. In practice, the tank 23 arranged in an external portion is connected via a piping (not shown).

The bucket valve body 30' and the boom valve body 29', the boom valve body 29' and the ride valve body 31', and the ride valve body 31' and the speed increasing valve body 33' are respectively arranged in adjacent. Further, a piping in each of valve bodies is connected to each other through mating faces W1 to W3 between the adjacent bodies.

The block body 25 is formed as a closed center, and is formed as a parallel valve in which the boom valve 29 and the bucket valve 30 are connected in parallel to the hydraulic pump 21 by a pump piping 35. Accordingly, the travel vibration suppressing device 20 in which the oil path is formed by the internal piping is structured.

The bucket valve 30 is formed in the bucket valve body 30'. A bottom chamber 15*a* of the bucket cylinder 15 and a port 30*a* of the bucket valve 30 are connected by a bottom piping 39*a*, and a head chamber 15*b* of the bucket cylinder 15 and a port 30*b* are connected by a head piping 39*b*. Further, a port 30*c* is connected to a discharge port of the hydraulic pump 21 via a piping 35, and a port 30*d* is connected to the tank 23.

The bucket valve 30 can be switched among three positions comprising a tilt position (H) at which a piston of the bucket cylinder 15 is expanded, a damp position (L) at which the piston is contracted and a neutral position (N) at which the expanded or contracted state of the piston is maintained. When actuating the pilot pressure so as to switch an actuated position of the bucket valve 30 to the tilt position (H), the discharge pressure oil from the hydraulic pump 21 is supplied to the bottom chamber 15*a* of the bucket cylinder 15 via the port 30*c*, the port 30*a* and the bottom piping 39*a*, and the pressure oil in the head chamber 15*b* is discharged to the tank 23 via the head piping 39*b*, the port 30*b* and the port 30*d*. Accordingly, it is possible to expand the piston of the bucket cylinder 15.

Further, when switching the actuated position of the bucket valve 30 to the damp position (L), the discharge pressure oil from the hydraulic pump 21 is supplied to the head chamber 15*b* via the port 30*c*, the port 30*b* and the head piping 39*b*, and the pressure oil in the bottom chamber 15*a* is discharged to the tank 23 via the bottom piping 39*a*, the port 30*a* and the port 30*d*. Accordingly, it is possible to contract the piston. When the bucket valve 30 is at the neutral position (N), the connection between the bucket valve 30 and the bucket cylinder 15 is cut off, and it is possible to maintain the expanded or contracted state of the piston.

The boom valve 29 is formed in the boom valve body 29'. A bottom chamber 11*a* of the boom cylinder 11 and a port 29*a* of the boom valve 29 are connected via a bottom piping 37*a*, and a head chamber 11*b* and a port 29*b* are connected via a head piping 37*b*. Further, a port 29*c* is connected to a discharge port of the hydraulic pump 21 via a piping 35, and a port 30*d* is connected to the tank 23.

In both end portions of the boom valve 29, there are formed pilot chambers 49*a* and 49*b* for receiving a pilot pressure via a pressure proportional reducing valve (not shown) operated by an operation lever or the like. The pilot chambers 49*a* and 49*b* are structured such that one of the pilot chamber 49*a* or 49*b* receives the pilot pressure via the pressure proportional reducing valve (not shown), and the pressure oil in the other pilot chamber 49*b* or 49*a* is returned to the tank 23 via the pressure proportional reducing valve (not shown).

The boom valve 29 can be switched to four positions including a float position (F), a descent position (L), a neutral position (N) and an ascent position (H). A switching to four positions can be achieved by a spring acting on each of both ends of the boom valve 29 and the pilot pressure acting on the pilot chambers 49*a* and 49*b*.

At the ascent position (H), the discharge pressure oil from the hydraulic pump 21 is supplied to the bottom chamber 11*a* of the boom cylinder 11 via the port 29*c*, the port 29*a* and the bottom piping 37*a*, and the pressure oil in the head chamber 11*b* is discharged to the tank 23 via the head piping 37*b*, the ports 29*b* and 29*d*. Accordingly, the piston of the boom cylinder 11 is expanded so as to move the boom 10 upward.

At the neutral position (N), the connection between the boom valve 29 and the boom cylinder 11 is cut off, and it is possible to maintain the expanded or contracted state of the piston in the boom cylinder 11.

At the descent position (L), the discharge pressure oil from the hydraulic pump 21 is supplied to the head chamber 11*b* via the port 29*c*, the port 29*b* and the head piping 37*b*, and the pressure oil in the bottom chamber 11*a* is discharged to the tank 23 via the bottom piping 37*a*, the ports 29*a* and 29*d*. Accordingly, the piston of the boom cylinder 11 is contracted so as to move the boom 10 downward.

At the float position (F), all the port 29*a*, the port 29*b* and the port 29*d* are connected, and the bottom chamber 11*a* and the head chamber 11*b* are communicated in a state of being connected to the tank 23. Accordingly, it is possible to freely expand and contract the boom cylinder 11 according to an external force, thereby floating the boom 10.

The ride valve 31, a proportional control valve 56*b* serving as a control valve 56 for the ride valve and a pressure reducing valve 66 for charge are formed in the ride valve body 31'. The ride valve 31 is structured such that one end is urged by a spring, and a pilot chamber 56*a* for receiving a pilot pressure from the proportional control valve 56*b* is formed in the other end. The ride valve control portion 56 comprises the proportional control valve 56*b* and the pilot chamber 56*a*.

A port 31*a* of the ride valve 31 is connected to the accumulator 27 via a piping 40 for the accumulator. The port 31*b* is connected to the bottom chamber 11*a* from the bottom piping 37*a* via a piping 45*a* and a piping 73.

The port 31*c* is connected to the head chamber 11*b* from the head piping 37*b* via a piping 45*b*. A port 31 disconnected to the discharge port of the hydraulic pump 21 via the piping 35 and the pressure reducing valve 66 for charge, and the port 31*e* is connected to the tank 23.

The port 31*d* can be connected to the accumulator 27 via the port 31*a* and the piping 40 for the accumulator at a time when the ride valve 31 is not actuated.

The ride valve 31 can be switched between two positions including an actuated position (A) of the travel vibration suppressing device 20 connecting the accumulator 27 and the bottom chamber 11*a* of the boom cylinder 11, and a non-actuated position (B) of the travel vibration suppressing device 20 connecting the hydraulic pump 21 and the accumulator 27. The ride valve 31 is switched by controlling the proportional control valve 56*b* on the basis of an unshown control signal from a controller 57 (refer to FIG. 4).

The proportional control valve 56*b* is connected to a pump 59 for control. When the proportional control valve 56*b* is actuated by receiving the signal from the controller 57, the ride valve 31 is switched by supplying the discharge pressure oil from the pump 59 for control as the pilot pressure to the pilot chamber 56*a*. Further, the pressure reducing valve 66 for charge sets the pressure of the accumulator 27 to a set pressure set by the pressure reducing valve 66 for charge at a time when the ride valve 31 is not actuated.

In a case that the ride valve 31 exists at the non-actuated position (B) and the pressure reducing valve 66 for charge is actuated, the discharge pressure oil from the hydraulic pump 21 can be reduced in pressure so as to be accumulated in the accumulator 27. Further, when the ride valve 31 exists at the actuated position (A), the accumulator 27 and the bottom chamber 11*a* are connected, and the head chamber 11*b* is connected to the tank 23 via the port 31*c* and the port 31*e*.

When the ride valve 31 exists at the actuated position (A), the accumulator 27*t* can absorb and damp the pressure pulsation generated in the bottom chamber 11*a* of the boom cylinder 11 at a time when the wheel loader 11 travels. Further, the oil can be supplied and discharged between the head chamber 11*b* and the tank 23.

The speed increasing valve 33 is formed in the speed increasing valve body 33'. The port 33*a* of the speed increasing valve 33 is connected to the bottom piping 37*a* via a piping 73 and a piping 61 for supply oil externally disposed, by the boom speed increasing piping 41. A port 33*b* is connected to the discharge port of the hydraulic pump 21 via the piping 35, and a port 33*c* is connected to the tank 23.

The speed increasing valve 33 can be switched among three positions including a descent position (Ld) at which the contraction of the boom cylinder 11 speeds up, a neutral position (N) and an ascent position (Hu) at which the expansion of the boom cylinder 11 speeds up. A switching to three positions can be achieved by receiving the pilot pressure by pilot chambers 75*a* and 75*b* formed in both ends of the speed increasing valve 33.

A spring is arranged in each of the pilot chambers 75*a* and 75*b*, and holds the speed increasing valve 33 at the neutral position (N). The same pilot pressure is applied to the pilot chamber 75*a* and the pilot chamber 49*a* of the boom valve 29 via a pilot piping 77*a*. Further, a same pilot pressure is applied to the pilot chamber 75*b* and the pilot chamber 49*b* of the boom valve 29 via the pilot piping 77*b*.

When the pilot pressure is applied to one pilot chamber of the pilot chamber 75*a* and the pilot chamber 49*a* or of the pilot chamber 75*b* and the pilot chamber 49*b*, the other pilot chamber is connected to the tank 23. Accordingly, the speed increasing valve 33 can be switched in synchronization with the boom valve 29.

The speed increasing valve 33 is switched to the descent position (Ld) when the boom valve 29 is switched to the descent position (L) or the float position (F) by receiving the pilot pressure and the speed increasing valve 33 is switched to the descent position (Ld) by receiving the same pilot pressure. At this time, the discharge pressure oil from the hydraulic pump 21 is supplied to the head chamber 11*b* via the boom valve 29. The pressure oil in the bottom chamber 11*a* is discharged to the tank 23 from the boom valve 29 via the bottom pipings 37'*a* and 37*a*, and from the speed increasing valve 33 through the piping 41 via the pipings 61 and 73 branched from the bottom piping 37*a*.

When the boom valve 29 exists at the neutral position (N) and the speed increasing valve 33 also exists at the neutral position (N), a connection between the port 33*b* and the port 33*a* is cut off. When the boom valve 29 is switched to the ascent position (H) by receiving the pilot pressure, and the speed increasing valve 33 is switched to the ascent position (Hu) by receiving the same pilot pressure, the discharge pressure oil from the hydraulic pump 21 is supplied to the bottom chamber 11*a* via the boom valve 29 and the speed increasing valve 22. The pressure oil in the head chamber 11*b* is discharged to the tank 23 from the boom valve 29.

The description of the embodiment in which the bucket valve 30, the boom valve 29, the ride valve 31 and the speed increasing valve 33 are controlled by the pilot pressure has been given, however, the control of each of the valves is not limited to the control by the pilot pressure, but can be executed by an electromagnetic solenoid. Further, the pilot chamber or an electromagnetic solenoid portion of each of the valves can be detachably mounted by being arranged in an outer side of a valve block. Accordingly, it is possible to downsize each of the valve blocks, and it is possible to improve a maintainability of the pilot chamber or the electromagnetic solenoid portion.

The piping 35 is arranged through each of a mating face W1 between the bucket valve body 30' and the boom valve body 29', a mating face W2 between the boom valve body 29' and the ride valve body 31', and a mating face W3 between the ride valve body 31' and the speed increasing valve body 33'. Further, the piping 45*b* is arranged through the mating face W2 between the boom valve body 29' and the ride valve body 31'. The piping 73 and the pilot piping 77*b* are respectively arranged through the mating face W2 between the boom valve body 29' and the ride valve body 31', and the mating face W3 between the ride valve body 31' and the speed increasing valve body 33'. The piping 61 for supplying oil is arranged by an external piping.

The pilot pipings 77*a* and 77*b* may be structured as an internal piping or may be structured as an external piping.

The description of the structure in which the speed increasing valve 33 is arranged in a laminated manner as a structure of the travel vibration suppressing device 20 has been given, however, the speed increasing valve 33 is not necessarily provided, but may be additionally provided for a purpose of rapidly actuating the boom 5 if the working vehicle is large. The speed increasing valve 33 can reduce the resistance and can supply the pressure oil even if a load capacity of the bucket is increased and a diameter of the boom cylinder 11 actuating the bucket becomes large.

Next, a description of an actuation of the travel vibration suppressing device 20 will be given. A description of an actuation of the ride valve 31 with reference to FIGS. 4, 5 and 6, will be first given and a description of a vibration suppression of the travel vibration suppressing device 20 with regard to the wheel loader 1 will be given next.

Figure 4:
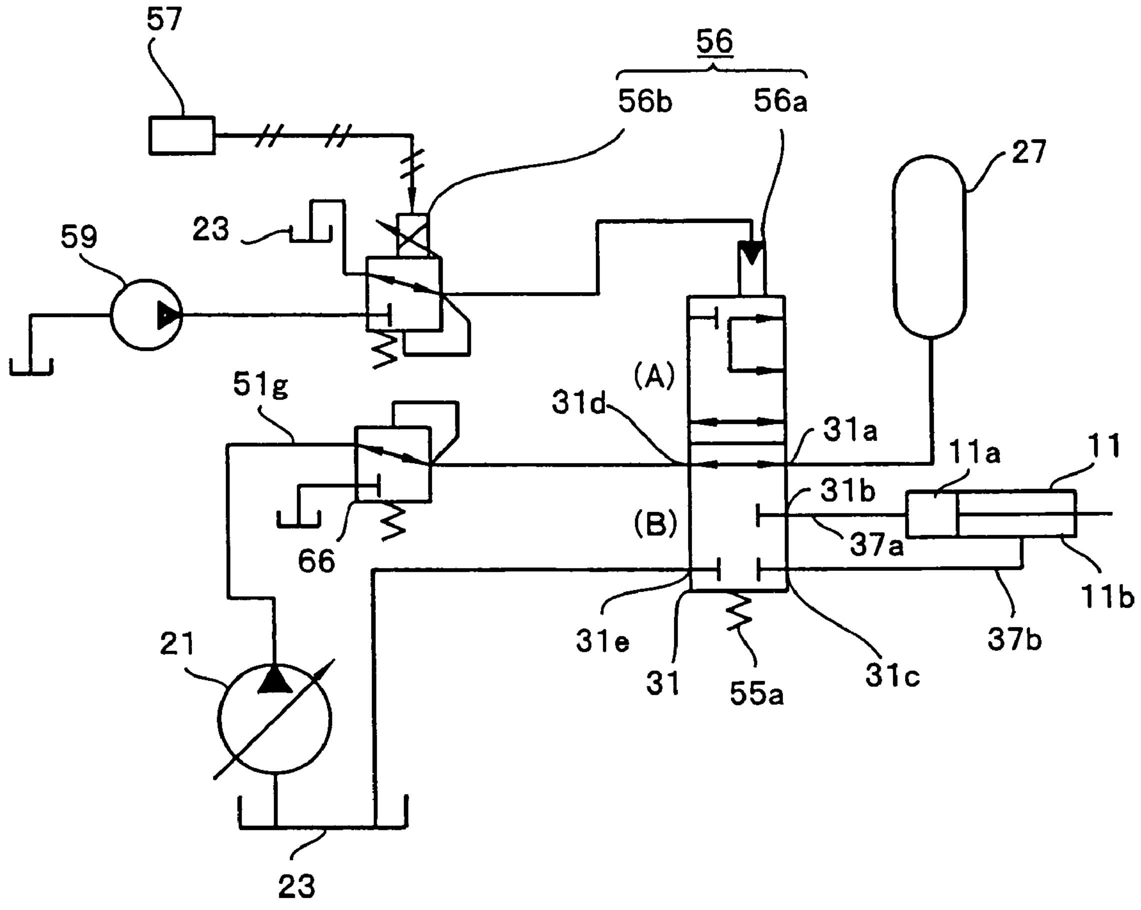
FIG. 4 is a circuit diagram of a ride control valve and a control portion (first embodiment).

FIG. 4 is shown while omitting structures of the boom valve 29 and the speed increasing valve 33, for explaining a structure of the ride valve 31. As shown in FIG. 4, when the control signal is not output from the controller 57 and the ride valve 31 is not actuated, the proportional control valve 56*b* connects the pilot chamber 56*a* of the ride valve 31 and the tank 23, and decreases the pilot pressure applied to the pilot chamber 56*a*. The ride valve 31 is positioned at the non-actuated position (B) of the travel vibration suppressing device 20 by an urging force of the spring 55*a*.

At this time, the ride valve 31 supplies the discharge pressure oil in the pressure pump 21 the pressure of which is reduced to the charge pressure set by the pressure reducing valve 66 for charge to the accumulator 27, and accumulates as the pressure of the accumulator 27.

When starting an actuation of the ride valve 31, a control current output to the proportional control valve 56*b* from the controller 57 is sequentially increased from a time T1, as shown in FIG. 6A. The proportional control valve 56*b* receives the control signal from the controller 57, connects the pilot chamber 56*a* of the ride valve 31 and the pump 59 for control, and gradually increases the pilot pressure supplied to the pilot chamber 56*a*.

Accordingly, a spool of the ride valve 31 increases a stroke amount against the urging force of the spring 55*a* as shown in FIG. 6B. Accordingly, the ride valve 31 is switched to the actuated position (A) from the non-actuated position (B). At this time, as shown in FIG. 6C, an opening area Sa communicating the port 31*d* with the port 31*a* is reduced from an area of A1 and becomes in such a state that an area is zero (A0) at a time T2. The state in which the area is zero (A0) is maintained thereafter.

From the time T2 to a time T3, as shown in FIG. 6D, an opening area Sb communicating the port 31*a* and the port 31*b* is increased from zero (A0) to become A3 at the time T3. Further, at this time, as shown in FIG. 6E, an opening area Sc communicating the port 31*c* with the port 31*e* is increased from zero (A0) to become A4 at the time T3.

In this case, the opening area Sc by which the port 31*c* and the port 31*e* are communicated so as to connect the head chamber 11*b* to the tank 23 may be set to a fully open state in which the area becomes A4 from the time T2. Further, a switching speed of the ride valve 31 can be controlled on the basis of a magnitude of a control current output to the proportional control valve 56*b* from the controller 57. Accordingly, it is possible to freely set the switching speed of the ride valve 31 by controlling the magnitude of the control current.

The proportional control valve 56*b* is controlled while the control current from the time T3 to the time T4 is increased, however, at the time T3 before reaching the time T4, the opening area Sb communicating the port 31*a* with the port 31*b* becomes a constant value of A3, the opening area Sc communicating the port 31*c* with the port 31*e* becomes a constant value of A4, and the opening area is not increased any more. After the time T4, the control current output from the controller 57 becomes a constant value.

Figure 5:
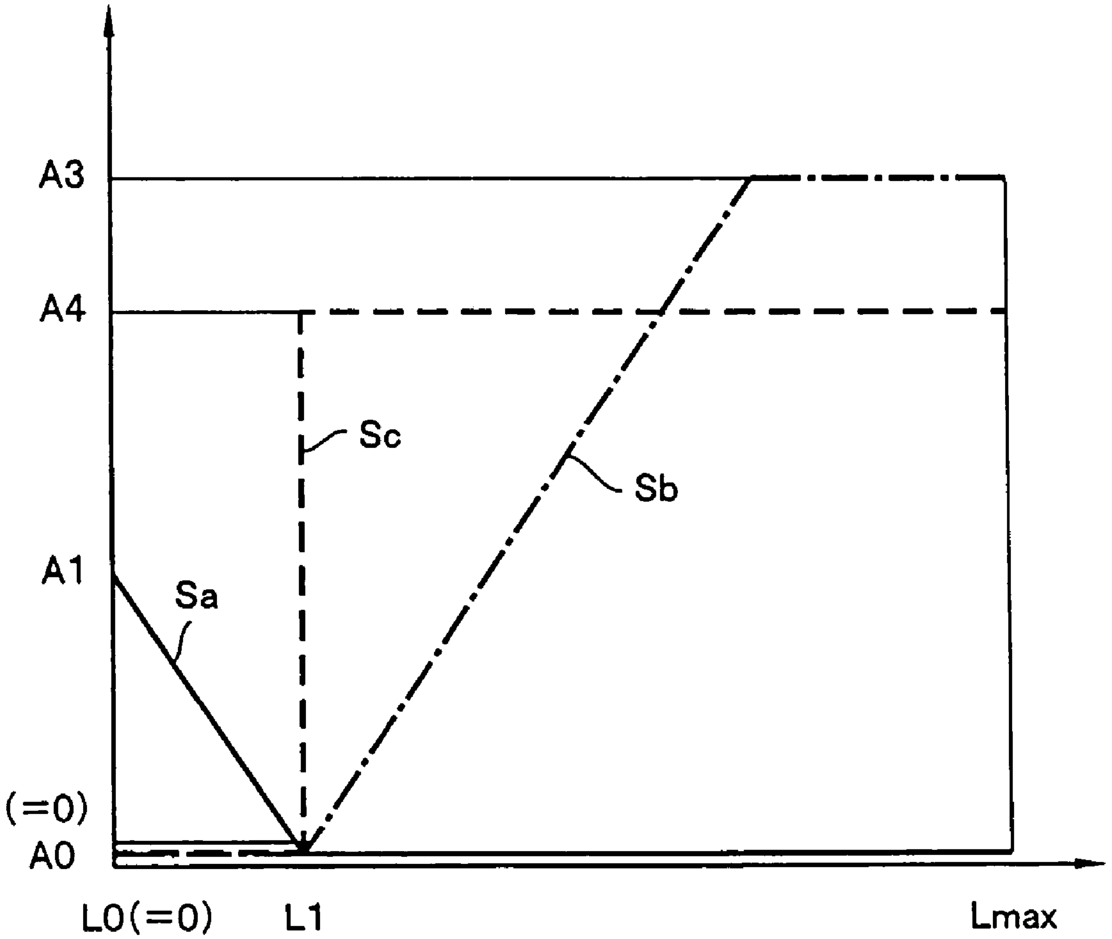
FIG. 5 is a view explaining a stroke and an opening area of the ride control valve (first embodiment).
Figure 6:
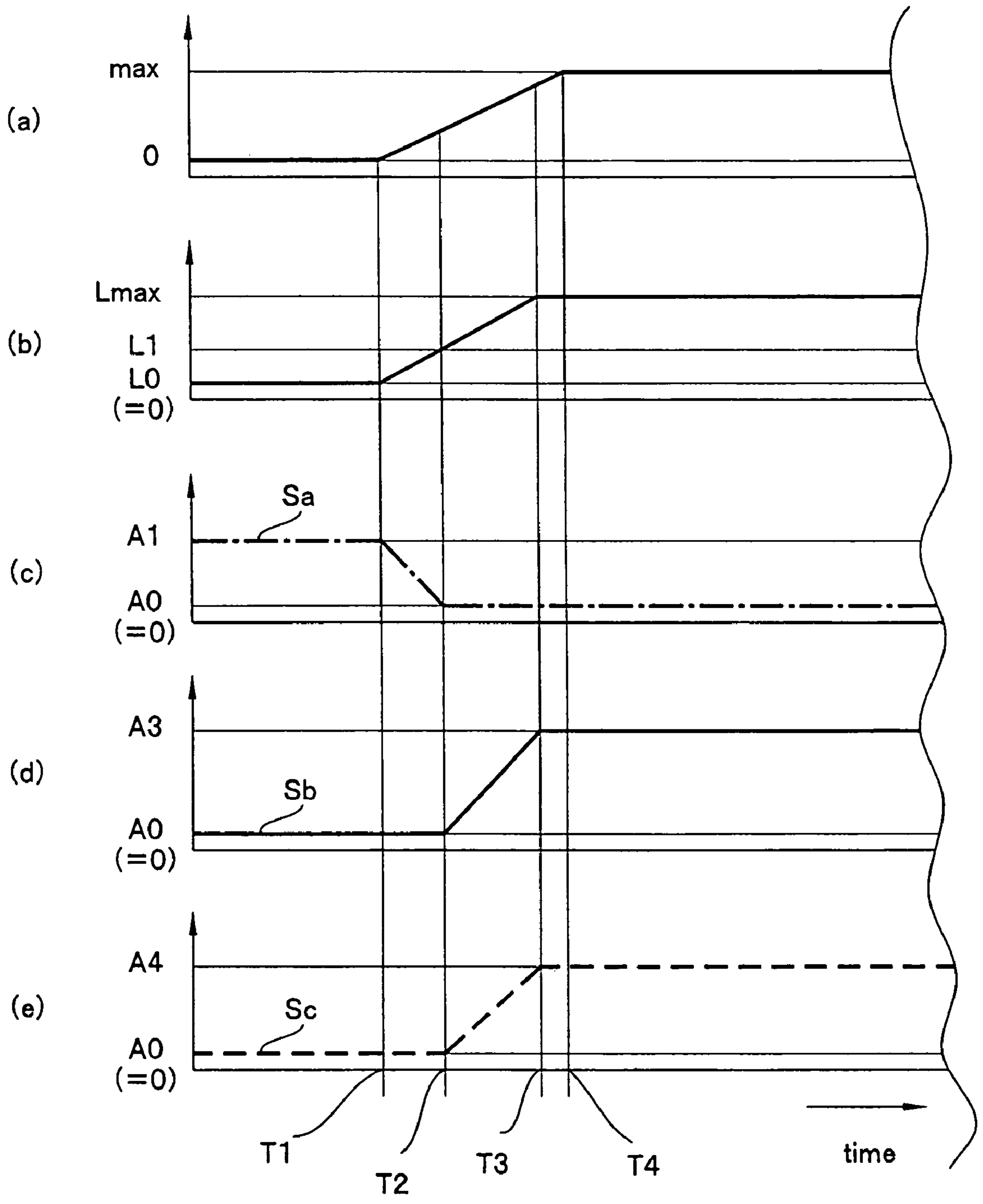
FIG. 6 is a time chart of the ride control valve (first embodiment).

FIG. 5 is a view showing a relation of a stroke amount of a spool of the ride valve 31 with respect to the opening area Sa communicating the port 31*d* with the port 31*a*, the opening area Sb communicating the port 31*a* with the port 31*b*, and the opening area Sc communicating the port 31*c* with the port 31*e*, by setting a stroke amount of the spool of the ride valve 31 to a horizontal axis and setting the opening area to a vertical axis.

In FIG. 5, there is shown a matter that the port 31*c* and the port 31*e* are communicated and the opening area Sc connecting the head chamber 11*b* to the tank 23 is changed to A4 from zero (A0), at a time when the spool of the ride valve 31 moves at a stroke equal to or more than a stroke L1. In other words, as described above in the description of FIG. 6, the opening area Sc in which the port 31*c* and the port 31*e* are communicates so as to connect the head chamber 11*b* to the tank 23 becomes the area of A4 from the time T2 so as to become in the fully open state.

In FIG. 5, it is possible to sequentially increase the opening area Sc in accordance with an increase of the stroke amount from the stroke L1 in the spool of the ride valve 31, in a same manner as shown in FIG. 6E.

Accordingly, it is possible to obtain a predetermined amount of stroke set with respect to the spool of the ride valve 31, and it is possible to securely obtain upper limit areas A3 and A4 which can be opened as the opening areas Sb and Sc.

When the travel of the wheel loader 1 is finished, and an operator turns off a switch (not shown) for controlling the proportional control valve 56*b*, the ride valve 31 is returned to the non-actuated position (B). At this time, the opening area Sa is returned to the area of A1 from the state of zero (A0), and the opening areas Sb and Sc are respectively returned to the state of zero (A0) from the states of the area A3 and the area A4.

Next, a description of the vibration suppression of the wheel loader 1 using the travel vibration suppressing device 20 will be given. For example, when the wheel loader 1 executes an excavating work, a switch (not shown) for controlling the proportional control valve 56*b* is turned off. Accordingly, the controller 57 does not output the control current to the proportional control valve 56*b*, but the ride valve 31 stays at the non-actuated position (B).

Figure 3:
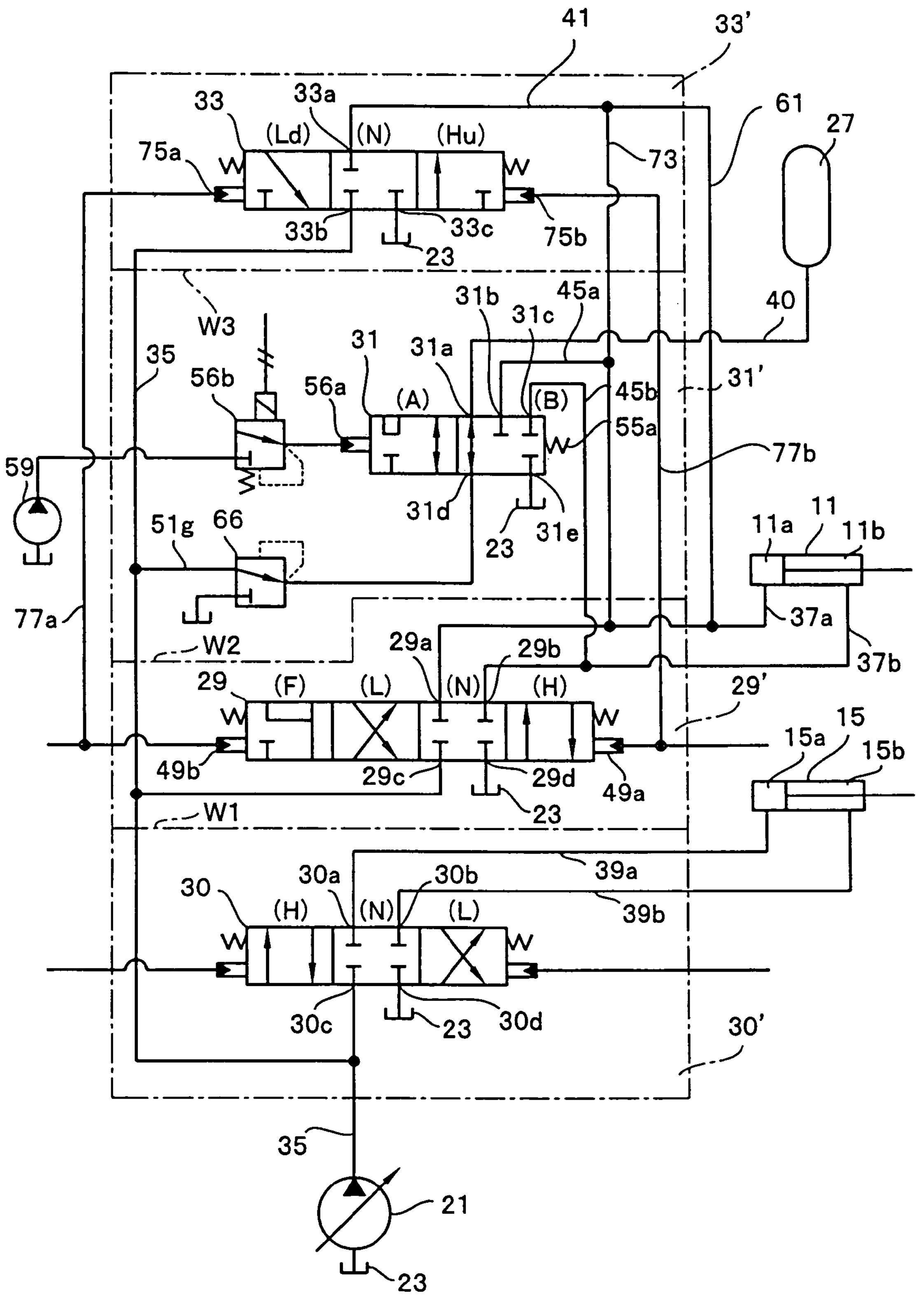
FIG. 3 is a pressure circuit of the travel vibration suppressing device (first embodiment).

At this time, as shown in FIG. 3, the bottom chamber 11*a* of the boom cylinder 11 is connected to the port 29*a* of the boom valve 29 and the port 33*a* of the speed increasing valve 33, and the head chamber 11*b* is connected to the port 29*b* of the boom valve 29. In this state, the speed increasing valve 33 is operated at a same time as the boom valve 29 is operated by the pilot pressure, the discharge pressure oil in the hydraulic pump 21 is supplied and discharged to the boom cylinder 11 via the boom valve 29 and the speed increasing valve 33, and executes the expansion and contraction with respect to the boom cylinder 11, thereby executing the excavating work.

In order to suppress a generation of the pulsation in the pressure of the boom cylinder 11 according to a roll on a road surface at a time when the wheel loader 1 travels, the switch is turned on. Accordingly, the control current is output to the proportional control valve 56*b* from the controller 57, and switches the ride valve 31 to a side of the actuated position (A).

Accordingly, the spool of the ride valve 31 can obtain a predetermined amount of stroke on the basis of the pilot pressure output by the controlled proportional control valve 56*b*. The opening area Sb communicating the accumulator 51 in the ride valve 31 with the bottom chamber 11*a* of the boom cylinder 11 is increased to the upper limit opening area A3 from the state of zero (A0), according to the stroke amount in the spool of the ride valve 31. Further, the opening area Sc communicating the head chamber 11*b* of the boom cylinder 11 with the tank 23 is increased to the upper limit opening area A4 from the state of zero (A0) in FIG. 6E. In FIG. 5, the opening area directly becomes the upper limit opening area A4 from the state of zero (A0).

In a state in which the ride valve 31 is switched to the actuated position (A), the wheel loader 1 is traveled. At this time, the boom valve 29 and the speed increasing valve 33 are switched to the neutral position (N). Accordingly, it is possible to cut off both of the connection of the boom valve 29 and the ride valve 31 to the bottom chamber 11*a* of the boom cylinder 11, and the connection between the boom valve 29 and the head chamber 11*b*.

In a state in which the ride valve 31 exists at the actuated position (A), the wheel loader 1 is traveled. The vehicle body 7 is vibrated on the basis of a rolling state of a road surface, and an acceleration and a deceleration of the wheel loader 1. In accordance therewith, the boom 10 supporting the working apparatus 3 is going to rotate in an up and down directions, and the pressure pulsation is generated in the oil in the bottom chamber 11*a* of the boom cylinder 11 supporting the boom 10.

The bottom chamber 11*a* of the boom cylinder 11 is communicated with the accumulator 27 from the ride valve 31 via the piping 73 branched from the bottom piping 37*a*. Accordingly, it is possible to instantaneously circulate a lot of fluid with a low pressure loss. Further, at this time, the head chamber 11*b* is communicated with the tank 23 from the port 31*c* and the port 31*e* of the ride valve 31 via the head piping 37*b*, and can supply and discharge the pressure oil within the head chamber 11*b*. It is possible to quickly suppress the pressure pulsation in the boom cylinder 11 by rapidly supplying and discharging the pressure oil between the bottom chamber 11*a* of the boom cylinder 11 and the accumulator 27.

In accordance with the travel vibration suppressing device of the present invention, even in a case that the apparatus is installed in a middle or large scaled wheel loader 1 generating a great vibration, it is possible to rapidly suppress the pressure pulsation of the boom cylinder 11 between the bottom chamber 11*a* of the boom cylinder 11 and the accumulator 27.

In the description mentioned above, the opening area Sb in the ride valve 31 connecting the accumulator 27 and the bottom chamber 11*a* of the boom cylinder 11 becomes the upper limit opening area A3, and the opening area Sc in the ride valve 31 connecting the head chamber 11*b* of the boom cylinder 11 and the tank 23 becomes the upper limit opening area A4. However, the ride valve 31 may be used by setting the opening area Sb smaller than the opening area A3 instead of opening the opening area Sb to the upper limit opening area A3.

Second Embodiment

Figure 7:
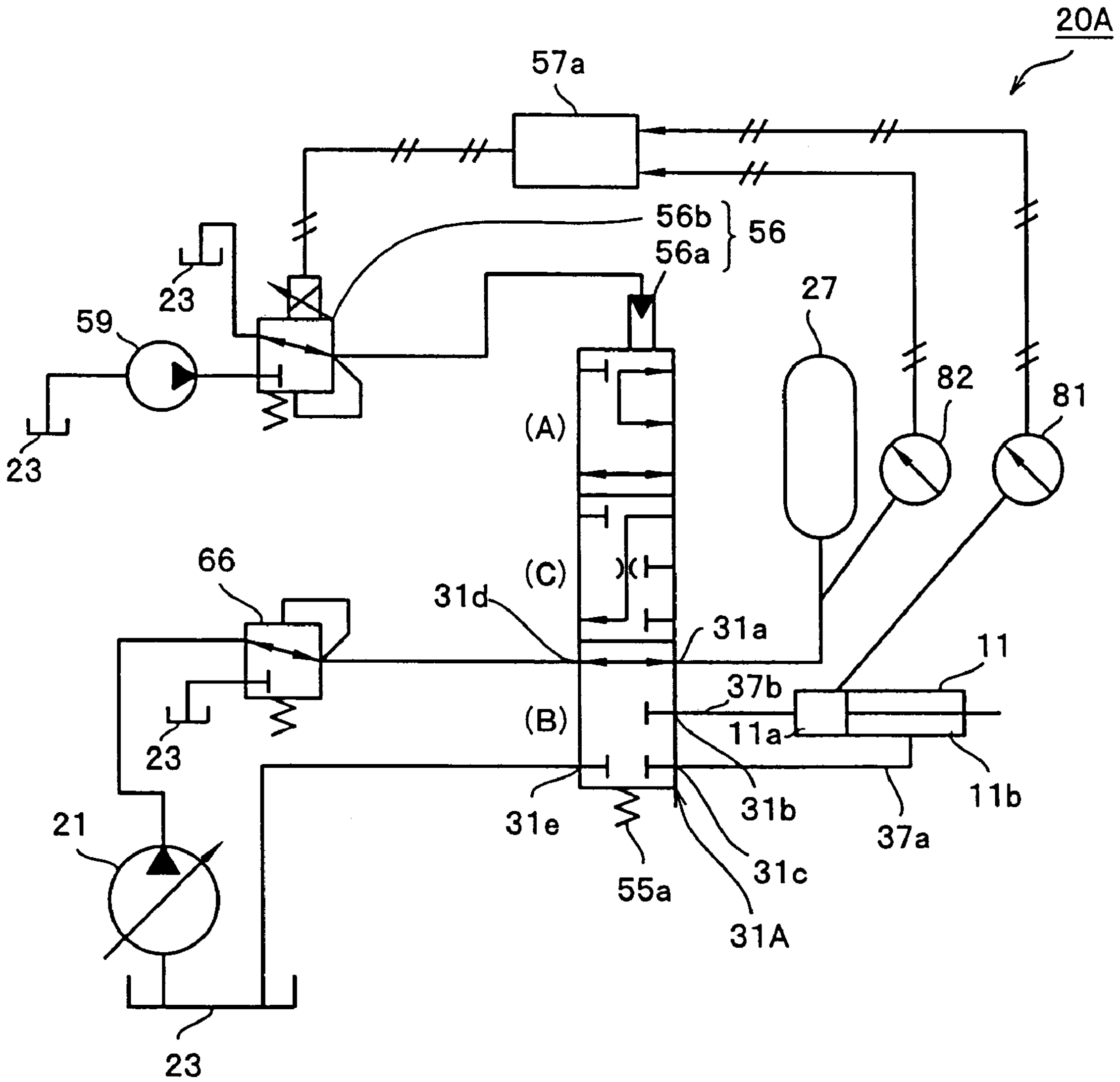
FIG. 7 is a circuit diagram of a first ride control valve and a control portion (second embodiment).
Figure 8:
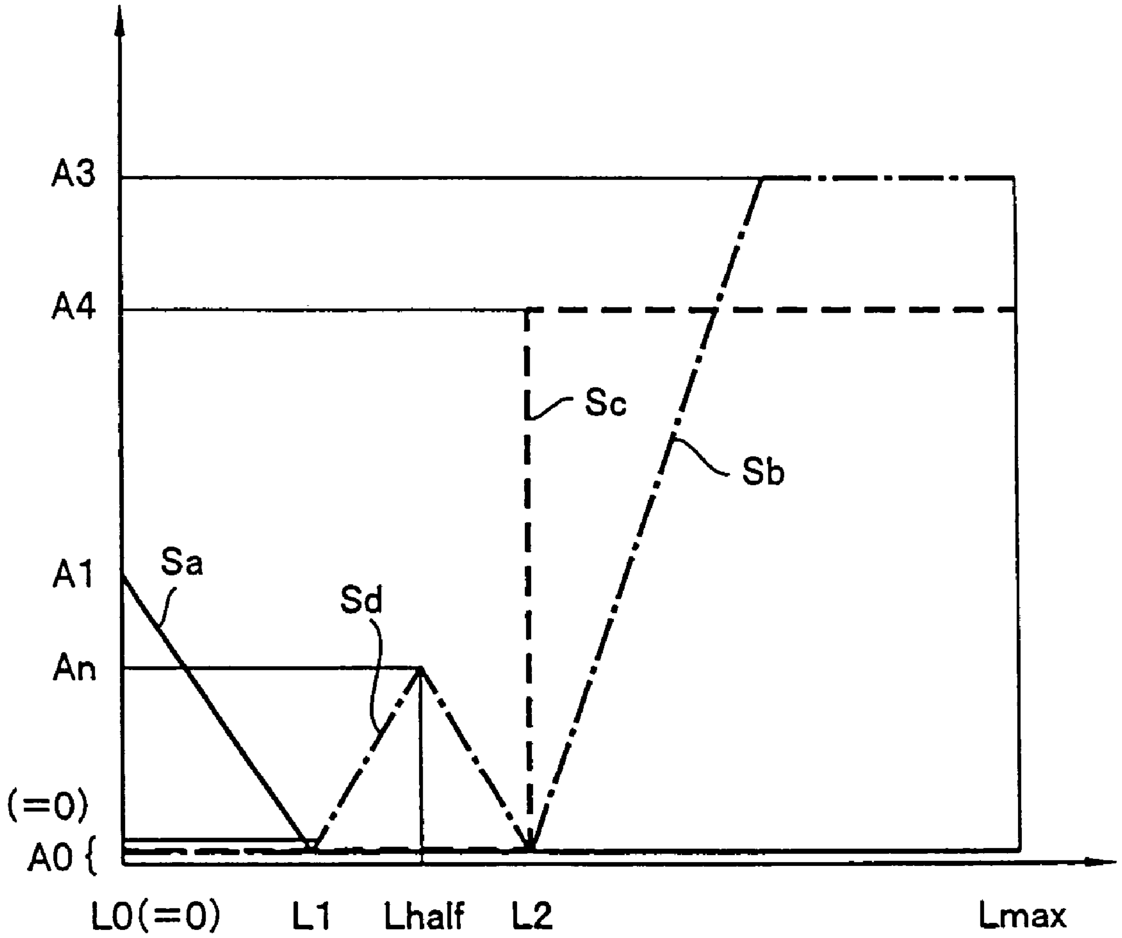
FIG. 8 is a view explaining a stroke and an opening area of the first ride control valve (second embodiment).
Figure 9:
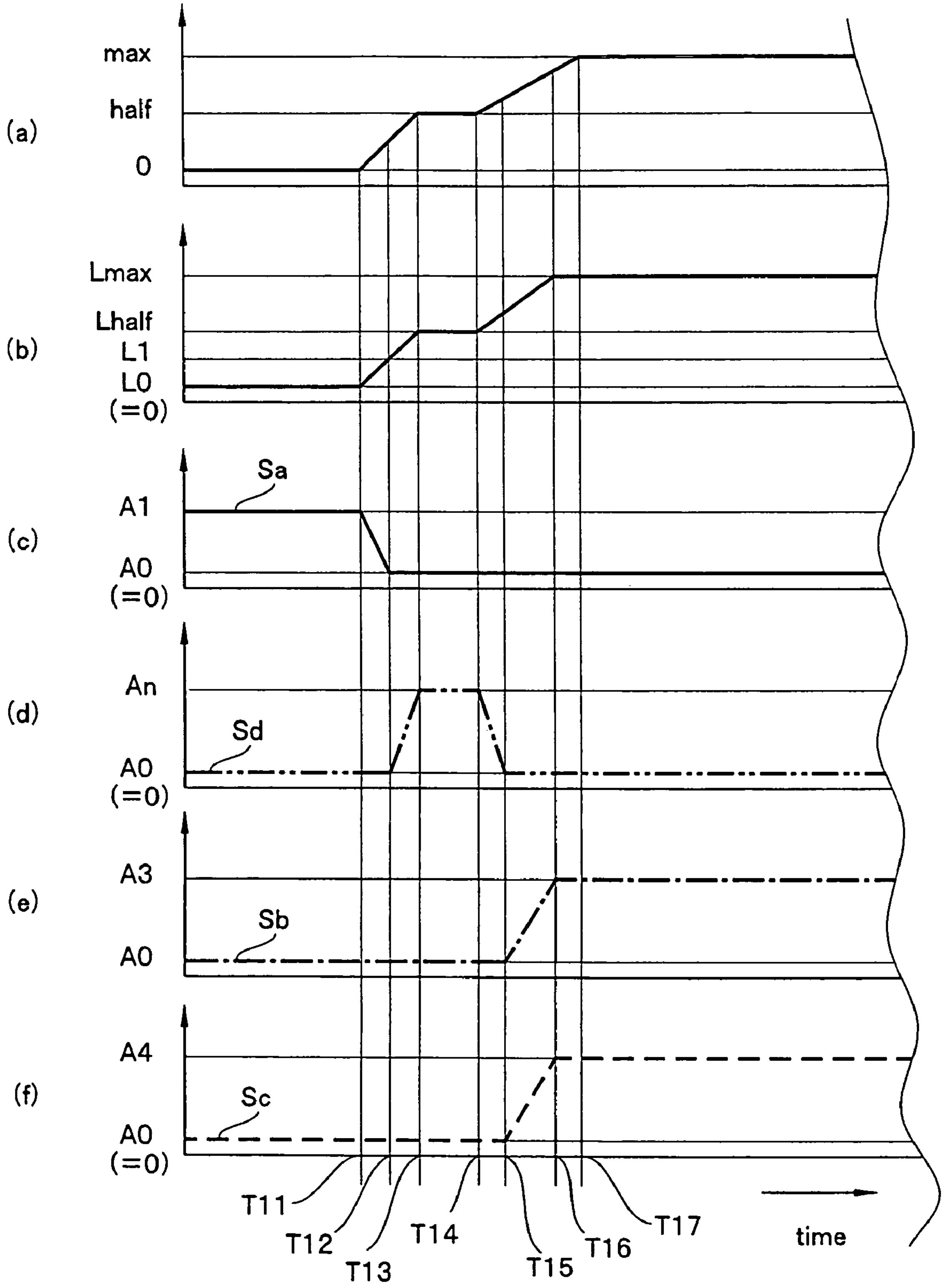
FIG. 9 is a time chart of the first ride control valve (second embodiment).

Next, a description of a travel vibration suppressing device 20A in accordance with a second embodiment of the present invention will be given. FIG. 7 shows a circuit diagram of the ride valve 31A and the control portion, FIG. 8 is a view explaining a relation between the stroke amount and the opening area of a ride valve 31A, and FIG. 9 shows a time chart. FIG. 7 is shown while omitting structures of the boom valve 29 and the speed increasing valve 33 for explaining a structure of the ride valve 31A.

The travel vibration suppressing device 20A in the second embodiment is mainly different from the travel vibration suppressing device 20 in accordance with the first embodiment in a part of a structure of the ride valve 31A, and a description of the same parts as those of the first embodiment will be omitted by attaching the same reference numerals thereto.

In FIG. 7, the travel vibration suppressing device 20A is structured such that the ride valve 31A is switched among three positions. Further, there are provided a pressure sensor 81 for the boom for detecting the pressure in the bottom chamber 11*a* of the boom cylinder 11, and a pressure sensor 82 for the accumulator for detecting the pressure of the accumulator 27. A controller 57*a* receives signals from both the pressure sensors 81 and 82 and outputs a control signal to a proportional control valve 56*b*.

In the ride valve 31A, a connection position (C) for connecting the port 31*a* and the port 31*e* is added between the actuated position (A) and the non-actuated position (B) of the ride valve 31 in the first embodiment. Since the structures at the actuated portion (A) and the non-actuated position (B) are the same as those in the first embodiment, a description of the structure of the connection position (C) will be mainly given.

At the connection portion (C), the ride valve 31A connects the port 31*a* and the port 31*e* via a throttle formed within the ride valve 31A. At the connection position (C), it is possible to discharge the pressure oil in the accumulator 27 to the tank 23 via the throttle.

In the second embodiment, the pressure accumulated in the accumulator 27 is equal to or higher than a maximum pressure corresponding to a sum of the pressure of a mass of the working apparatus 3, and the pressure by a mass of the sediment loaded on the bucket. Accordingly, even if the pressure of the boom cylinder 11 is changed as the mass of the working apparatus 3 is changed, it is possible to let a part of the pressure in the accumulator 27 loose into the tank 23 by using the connection position (C), so as to easily set the pressure in the accumulator 27 to the pressure suitable for the pressure in the bottom chamber 11*a* of the boom cylinder 11.

Next, a description of an actuation of the travel vibration suppressing device 20A will be given. A description of an actuation of the ride valve 31A by using FIGS. 7, 8 and 9 will be given first, and a description of an effect of suppressing the pressure pulsation of the boom cylinder 11 by the travel vibration suppressing device 20A equipped in the wheel loader 1 will be given next.

As shown in FIG. 7, when the travel vibration suppressing device 20A is not actuated, the controller 57*a* sets the proportional control valve 56*b* to a low pressure and sets the ride valve 31A to the non-actuated position (B), in the same manner as the first embodiment. At this time, the opening area Sa of the port 31*d* and the port 31*a* are connected in a state of the area A1, and the discharge pressure oil in the hydraulic pump 21 can be accumulated in the accumulator 27 after the pressure thereof is reduced to the pressure set by the pressure reducing valve 66 for charge.

When being actuated, the controller 57*a* sequentially increases the control current as shown in FIG. 9A so as to output to the proportional control valve 56*b* from a time T11 to a time T13 shown in FIG. 9. The proportional control valve 56*b* receives the control signal from the controller 57*a*, and progressively increases the pilot pressure in the controlling pump 59 so as to supply to the pilot chamber 56*a* of the ride valve 31A.

Accordingly, the spool in the ride valve 31A increases the stroke amount thereof as shown in FIG. 9B, and sequentially reduces the opening area Sa communicating the port 31*d* and the port 31*a* from the state of the opening area A1.

When the stroke amount of the spool in the ride valve 31A becomes a stroke amount L1 before the stroke amount reaches Lhalf, that is, at a time T12 in FIG. 9, the opening area Sa communicating the port 31*d* and the port 31*a* becomes zero (A0). Further, after the time T12, the opening area Sa is maintained at zero (A0).

From the time T12 to the time T13, the controller 57*a* increases the control current, and sets the ride valve 31A at the connection position (C) in FIG. 7. At this time, the spool in the ride valve 31A gradually increases the stroke amount to the Lhalf which is half a maximum stroke amount Lmax, as shown in FIG. 8B. Further, as shown in FIG. 8D, the opening area Sd communicating the port 31*a* and the port 31*e* is increased, and is set to an area An at the time T13.

An interval from the time T13 to the time T14 corresponds to a period reducing the pressure in the accumulator 27 to the pressure in the bottom chamber 11*a*, and it is determined on a basis of a magnitude of a differential pressure between the pressure in the accumulator 27 detected by the pressure sensor 82 and the pressure in the bottom chamber 11*a* detected by the pressure sensor 81 during the period. From the time T14 to the time T15, the spool of the ride valve 31A reduces the opening area Sd communicating the port 31*a* and the port 31*e* as shown in FIG. 8D while gradually increasing the stroke amount from the stroke amount Lhalf as shown in FIG. 8B, and sets the area to zero (A0) at a time T15. Accordingly, it is possible to set the pressure in the accumulator 27 to the pressure equal to the pressure in the bottom chamber 11*a*.

After the time T15, the same control as that after the time T2 in the first embodiment is executed. Accordingly, a description about the control after the time T15 is omitted on a basis of the description of the control after the time T2 in the first embodiment. The switching speed of the spool in the ride valve 31A can be controlled on a basis of the magnitude of the control current output to the proportional control valve 56*b* from the controller 57*a*. It is possible to freely set the switching speed of the ride valve 31A by controlling the magnitude of the control current in the same manner as the case in the first embodiment.

When the travel of the wheel loader 1 is finished, and the operator turns off the switch (not shown) for controlling the proportional control valve 56*b*, the ride valve 31A is returned to the non-actuated position (B). At this time, the opening area Sa is returned to an opening area state of A1 from the state of zero (A0), and the opening areas Sb and Sc are respectively returned to the state of zero (A0) from the states of the opening area A3 and the opening area A4.

Next, a description of the actuation of the travel vibration suppressing device 20A by using a conveying work of the wheel loader 1 will be give. However, since approximately the same actuation as that of the first embodiment can be executed, a description of different actuations will be mainly given.

When the wheel loader 1 travels and the operator turns on the switch (not shown) for controlling the proportional control valve 56*b*, the controller 57*a* inputs a pressure Pb in the bottom chamber 11*a* of the boom cylinder 11 generated according to an amount of the sediment loaded by the working apparatus 3 as a detected pressure from the boom pressure sensor 81. Further, it inputs an accumulator pressure Pa accumulated in the accumulator 27 as the detected pressure from the accumulator pressure sensor 82.

The controller 57*a* determines the differential pressure between the pressure Pb in the bottom chamber 11*a* and the accumulator pressure Pa. When the differential pressure is large, the controller 57*a* outputs the control current to the proportional control valve 56*b*, and sets the spool in the ride valve 31A to the stroke amount Lhalf corresponding to the half stroke shown in FIG. 9B. Accordingly, the ride valve 31A is set to the position (C), and the pressure in the accumulator 27 is reduced.

The controller 57*a* maintains the ride valve 31A at the position (C) until the differential pressure between the pressure Pb in the bottom chamber 11*a* and the accumulator pressure Pa falls within a predetermined allowable range. If the differential pressure becomes within the allowable range, the control current is again output to the proportional control valve 56*b*, and the spool of the ride valve 31A is stroked to the maximum stroke amount Lmax.

The ride valve 31A comes to the actuated position (A), connects the accumulator 27 and the bottom chamber 11*a* in the boom cylinder 11 at the opening area A3, and connects the tank 23 and the head chamber 11*b* in the boom cylinder 11 at the opening area A4.

When setting the ride valve 31A to the actuated position (A) so as to travel the wheel loader, it is possible to suppress the pressure fluctuation in the bottom chamber 11*a* of the boom cylinder 11, for example, generated at a time when the tire runs on a stone and the boom 10 is thrown up, in the same manner as the first embodiment. Further, since the accumulator 27 and the bottom chamber 11*a* are connected after setting the pressure in the accumulator 27 to the pressure approximately equal to the pressure in the bottom chamber 11*a*, it is possible to prevent the boom cylinder 11 from being rapidly expanded at a time of connecting to the accumulator 27.

In the above-mentioned description, the travel vibration suppressing device is actuated in a state in which the opening area Sb in the ride valve 31A is set to the openable upper limit opening area A3, and the opening area Sc is set to the operable upper limit area A4. However, the structure may be made such that the pressure in the bottom chamber 11*a* is rapidly absorbed by the accumulator 27 with a small flow path resistance, by using while keeping the opening area Sb at the upper limit opening area A3 at a time of the pressure increase in the bottom chamber 11*a*, and the pressure oil from accumulator may be slowly supplied to the bottom chamber 11*a* by setting the upper limit area in the opening area Sb to a smaller opening area than the area A3 at a time of the pressure reduction in the bottom chamber 11*a* so as to make the resistance slightly larger.

Third Embodiment

Figure 10:
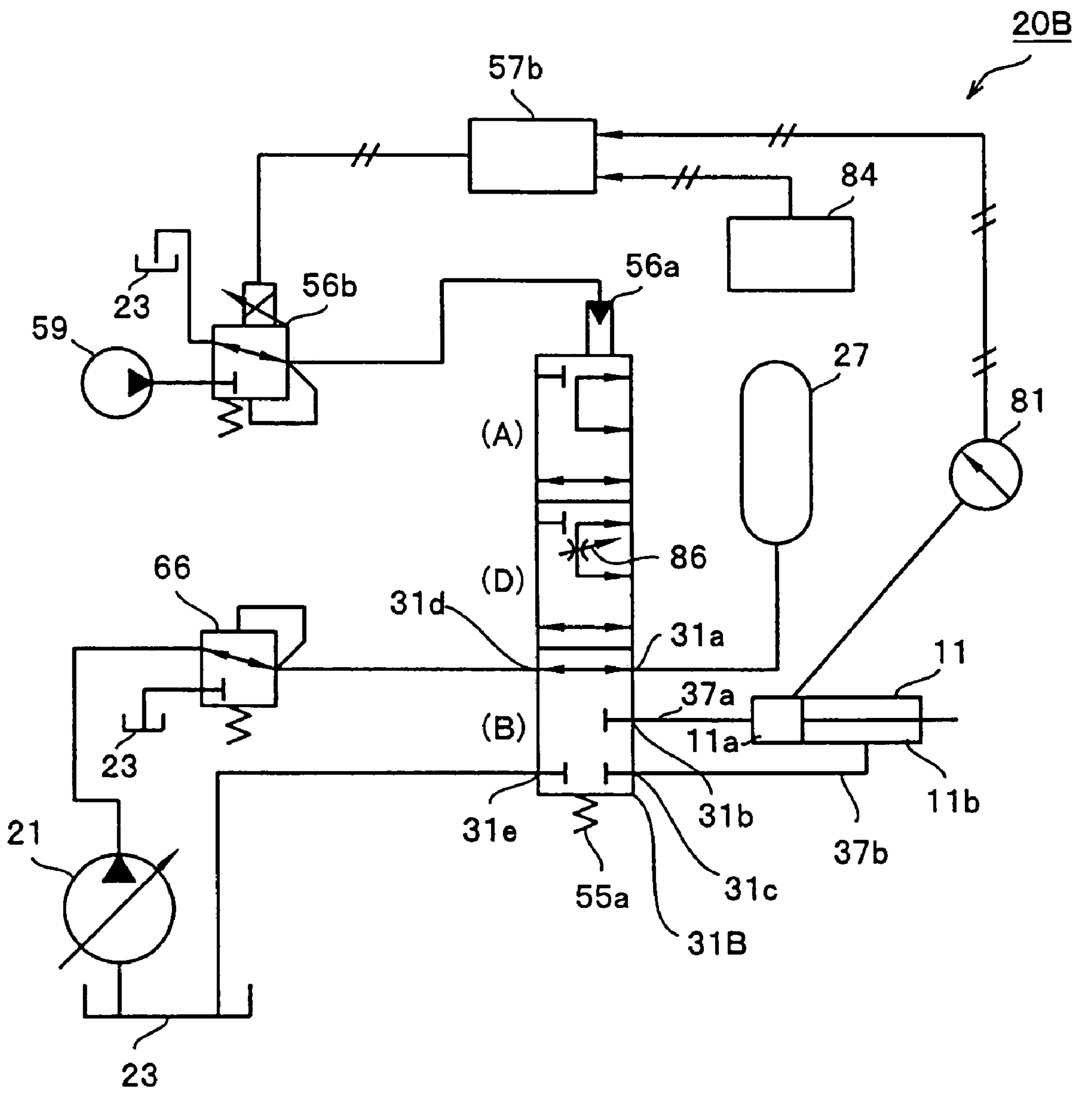
FIG. 10 is a circuit diagram of a second ride control valve and a control valve (third embodiment).
Figure 11:
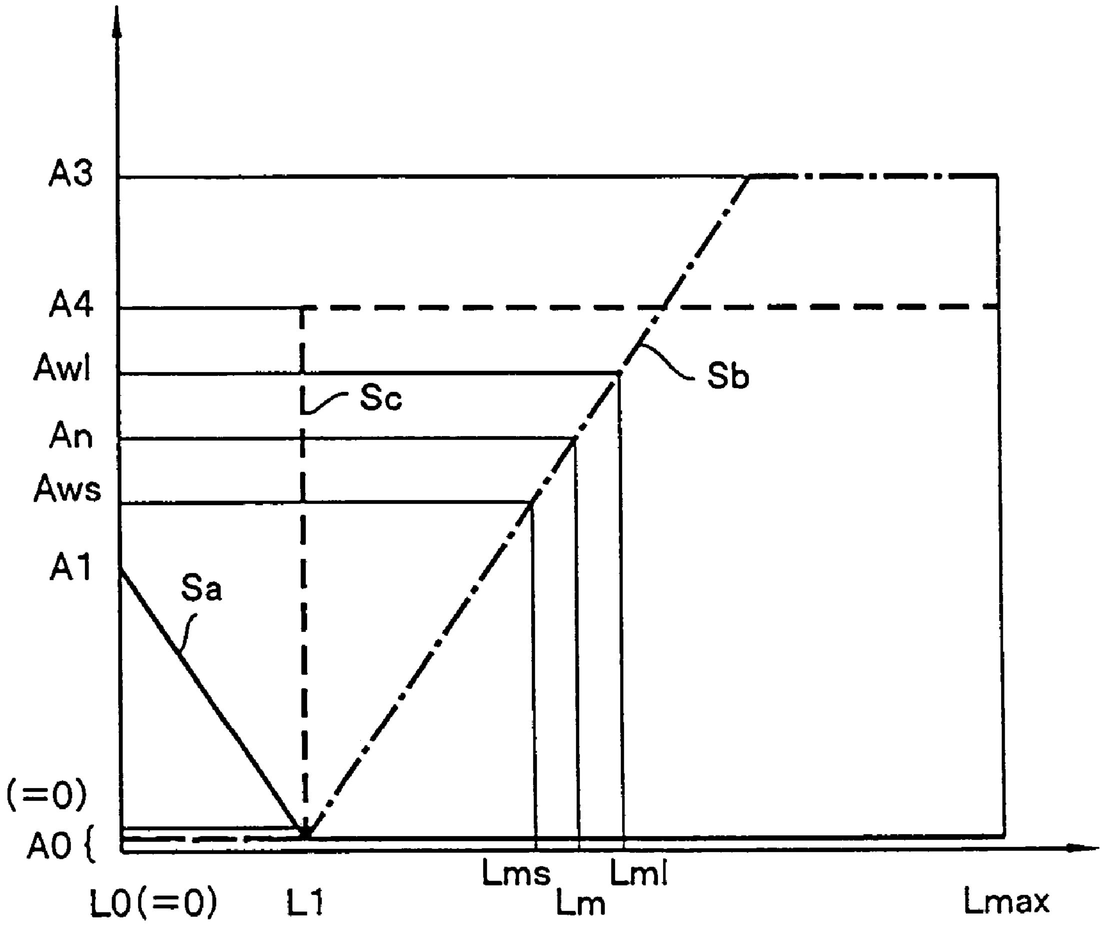
FIG. 11 is a view explaining a stroke and an opening area of the second ride control valve (third embodiment).
Figure 12:
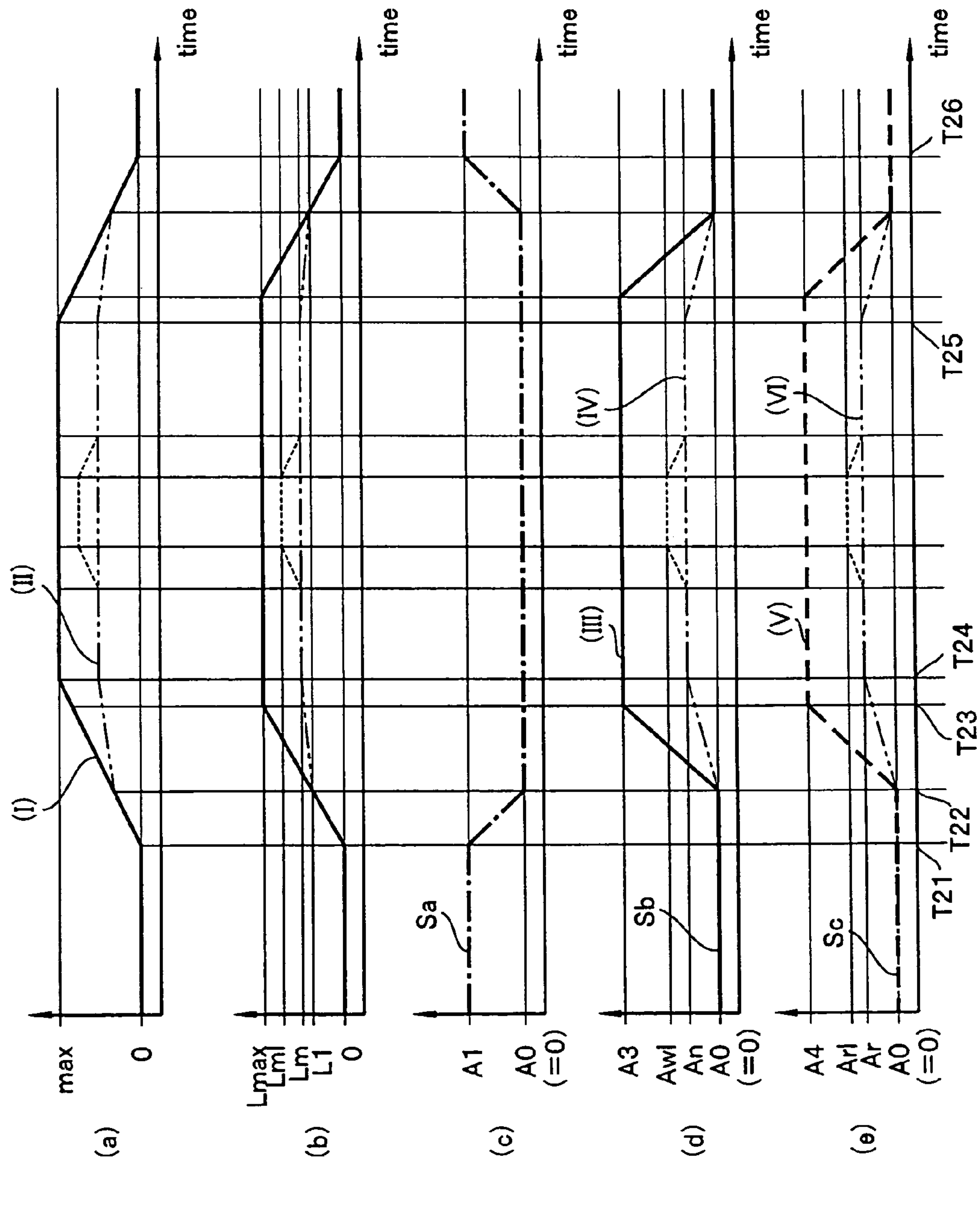
FIG. 12 is a time chart of the second ride control valve (third embodiment).

Next, a description of a travel vibration suppressing device 20B in accordance with a third embodiment of the present invention will be given. FIG. 10 shows a circuit diagram of the ride valve 31B and the control portion, FIG. 11 is a view explaining a relation between the stroke and the opening area of the ride valve 31B, and FIG. 12 shows a time chart. In this case, the travel vibration suppressing device 20B is mainly different from the travel vibration suppressing device 20 in accordance with the first embodiment in a part of a structure of a ride valve 31B, and a description of the same parts as those of the first embodiment will be omitted by attaching the same reference numerals thereto. FIG. 10 is shown while omitting the structures of the boom valve 29 and the speed increasing valve 33 for explaining the structure of the ride valve 31B.

In FIG. 10, the travel vibration suppressing device 20B is structured such that the ride valve 31B is switched at three positions. Further, there are provided the pressure sensor 81 for the boom for detecting the pressure in the bottom chamber 11*a* of the boom cylinder 11, and a travel state detecting sensor 84 for detecting the vehicle travel state. A controller 57*b* receives signals from the boom pressure sensors 81 and the travel state detecting sensor 84 and outputs a control signal to the proportional control valve 56*b*.

In the ride valve 31B, a connection position (D) at which the port 31*a* and the port 31*b* is connected is added between the actuated position (A) and the non-actuated position (B) of the ride valve 31 in the first embodiment. In other words, at the connection position (D) of the ride valve 31B, the accumulator 27 and the bottom chamber 11*a* of the boom cylinder 11 are connected via a variable throttle 86.

The variable throttle 86 may be structured, for example, such that a plurality of taper-shaped slit grooves or the like are provided in the spool of the ride valve 31B from the port 31*a* toward the port 31*b* in a circumferential direction of the spool, and an opening area Sa communicating the port 31*a* and the port 31*b* can be varied on a basis of a change of the opening area of the plurality of the slit grooves according to a movement of the spool.

As the travel state detecting sensor 84, for example, a sensor which can detect a vehicle travel state such as a speed sensor, a sensor which can detect a speed gear of a transmission and a rotational speed of an engine, a sensor which can detect the speed gear of the transmission and a stroke position of an accelerator pedal, an acceleration detecting sensor for detecting an acceleration and a deceleration of the vehicle, a global positioning system (GPS) sensor which can detect a current position of the vehicle, and the like can be employed.

When setting the ride valve 31B to a non-actuated state, the controller 57*b* makes the pilot pressure output from the proportional control valve 56*b* low so as to position the ride valve 31B to the non-actuated position (B), in the same manner as that of the first embodiment. Accordingly, the opening area Sa communicating the port 31*d* and the port 31*a* is set to the area A1, and the hydraulic pump 21 and the accumulator 27 are connected via the pressure reducing valve 66 for charge.

When actuating the ride valve 31B, the controller 57*b* controls such that the pilot pressure output from the proportional control valve 56*b* becomes a predetermined pressure, on a basis of detected information obtained from each of the travel state detecting sensor 84 and the boom pressure sensor 81. Accordingly, the ride valve 31B is switched to the connection position (D), and the accumulator 27 and the bottom chamber 11*a* of the boom cylinder 11 are connected via the variable throttle 86.

At this time, the controller 57*b* controls the proportional control valve 56*b*, for example, such that the opening area of the variable throttle 86 becomes small in a case that a vehicle speed is high, and/or a load weight is large, thereby fastening the throttle. On the contrary, when the vehicle speed is low and/or the load weight is small, it controls such that the opening area of the variable throttle 86 becomes large, thereby loosening the throttle.

A description of an operation of the ride valve 31B will be given by using a view of a relation between the stroke and the opening area in FIG. 11, and a time chart in FIG. 12.

The controller 57*b* output the control current to the proportional control valve 56*b* so as to sequentially increase from a time T21 to a time T24, as shown in FIG. 12A. The proportional control valve 56*b* receives the control signal from the controller 57*b*, and gradually increases the pilot pressure supplied to the pilot chamber 56*a* of the ride valve 31B.

In a case of making the opening area of the variable throttle 86 large, the controller 57*b* outputs the control current having a large inclination to the proportional control valve 56*b*, as shown by a solid line I in FIG. 12A. In a case of making the opening area of the variable throttle 86 small, the control current having a small inclination is output to the proportional control valve 56*b*, as shown by a two-dot chain line (II) from a time T22.

In a case of making the opening area of the variable throttle 86 small, it is also possible to output the control current from the controller 57*b* as the control current having a small inclination to the proportional control valve 56*b* from the time T21. However, in view of shortening a time until the connection between the hydraulic pump 21 and the accumulator 27 is cut off, that is, a time until the spool of the ride valve 31B reaches the stroke amount L1, it is desirable to output the control current having the small inclination to the proportional control valve 56*b* from the controller 57*b* from the time T22.

Accordingly, the stroke amount of the spool of the ride valve 31B is being increased as shown in FIG. 12B. As shown in FIG. 11, if the stroke amount of the spool of the ride valve 31B exceeds the amount L1, that is, after the time T22 in a solid line in FIG. 12C, the opening area Sa from the port 31*d* to the port 31*a* is set to the area zero (A0).

The controller 57*b* continuously increases the control current from the time T22 to the time T24, the spool of the ride valve 31B increases the stroke amount, and when the stroke amount of the ride valve 31B exceeds the amount L1, the ride valve 31B is switched to the connection position (D) in FIG. 10.

The stroke amount of the spool of the ride valve 31B is increased more than the amount L1, whereby the ride valve 31B gradually increases the opening area Sb between the port 31*a* and the port 31*b* and the opening area Sc between the port 31*c* and the port 31*e*, as shown in FIGS. 11, 12D and 12E. The opening area Sc between the port 31*c* and the port 31*e* can be fully opened to the area A4, when the spool of the ride valve 31B exceeds the stroke amount L1 as shown in FIG. 11.

Further, at this time, the controller 57*b* outputs the control current corresponding to the detected signal from the boom pressure sensor 81 and the travel state detecting sensor 84 to the proportional control valve 56*b*, and controls the pressure of the pilot pressure output from the proportional control valve 56*b*. For example, in a case of making the opening area of the variable throttle 86 large as mentioned above, the controller 57*b* outputs the control current having a large inclination to the proportional control valve 56*b* as shown by a solid line (I) in FIG. 12A. In a case of making the opening area of the variable throttle 86 small, the control current having a small inclination is output to the proportional control valve 56*b*, as shown by a two-dot chain line (II).

In a case that the control current is large as shown by a solid line (I) in FIG. 12A, the stroke amount of the spool of the ride valve 31B becomes large as shown by a solid line in FIG. 12(B) from the time T22 to the time T23. Accordingly, as shown in FIG. 12D, the opening area Sb between the boom cylinder 11 and the accumulator 27 can be made larger to an area A3 as shown by a solid line (III).

In a case that the control current is small as shown by a two-dot chain line (II) in FIG. 12A, the stroke amount of the spool of the ride valve 31B becomes small as shown by a two-dot chain line in FIG. 12B. The opening area Sb between the boom cylinder 11 and the accumulator 27 can be made larger to an area An which is smaller than the area A3 as shown by a two-dot chain line (IV) in FIG. 12D.

In a same manner, as shown in FIG. 12E, the opening area Sc communicating the tank 23 and a head chamber 1*b* of the boom cylinder 11 can be made larger to an area A4 as shown by a dotted line (V) in a case that the control current is large. In a case that the control current is small, it can be made larger to an area Ar which is smaller than the area A4 as shown by a two-dot chain line (VI).

In a case of exceeding the time T23 in the solid line in FIG. 12B, and in a case of exceeding the time T24 in the two-dot chain line in FIG. 12B, the spool of the ride valve 31B becomes at a constant stroke amount, and the opening areas Sb and Sc become constant. The upper limit opening area which can be opened as the opening areas Sb and Sc can be appropriately selected from an opening area between the solid line (III) and the two-dot chain line (IV) and an opening area between the solid line (III) and the two-dot chain line (IV), on a basis of a control current value previously stored according to the detected signals from the boom pressure sensor 81 and the travel state detecting sensor 84.

Further, in a case that the detected pressure from the boom pressure sensor 81 becomes small between the time T24 and the time T25, for example, due to a lightened load weight on a way, it is possible to output the control current corresponding to the detected pressure to the proportional control valve 56*b* from the controller 57*b* so as to change the upper limit opening areas which can be opened as the opening areas Sb and Sc from a state of an opening area An and an opening area Ar respectively to an opening area Aw1 and an opening area Ar1 as shown in FIGS. 12D and 12E.

On the contrary, for example, in a case that the load weight becomes heavy on a way and the detected pressure from the boom pressure sensor 81 becomes large, it is possible to output the control current corresponding to the detected pressure to the proportional control valve 56*b* from the controller 57*b* so as to reduce the upper limit opening area which can be opened as the opening area Sb to an area Aws as shown in FIG. 11. In a same manner, it is possible to reduce the upper limit opening area which can be opened as the opening area Sc.

During the time T25 to the time T26, the controller 57*b* can output a reverse signal that is reverse to a signal output from the time T21 to the time T24, can return the opening area Sb between boom cylinder 11 and the accumulator 27 and the opening area Sc between the boom cylinder 11 and the tank 23 to zero at a time when the stroke amount of the spool of the ride valve 31B is returned to L1, and can return the opening area Sa communicating the bottom chamber 11*a* of the accumulator 27 with the hydraulic pump 21 to the opening area A1 at a time when the stroke amount of the spool of the ride valve 31B is returned to L0, in the same manner as the first embodiment.

Next, a description of an actuation of the travel vibration suppressing device 20B will be given by using a conveying work of the wheel loader 1. However, since it is possible to execute approximately the same actuation as that of the first embodiment, a description of only the different actuation at a time of traveling will be given.

In a case that the operator turns on a switch (not shown) for controlling the proportional control valve 56*b* at a time when the wheel loader 1 travels, the controller 57*b* inputs the pressure Pb in the bottom chamber 11*a* of the boom cylinder 11 generated according to the sediment loaded by the working apparatus 3 as the detected pressure from the boom pressure sensor 81. Further, the controller 57*b* inputs the detected signal from the travel state detecting sensor 84.

The controller 57*b* determines an opening area of the variable throttle 86 corresponding to the pressure Pb previously determined from tests or the like and is stored, and a stroke amount with respect to the corresponding spool of the ride valve 31B, on a basis of the pressure Pb in the bottom chamber 11*a* detected by the boom pressure sensor 81. The control current is output to the proportional control valve 56*b* so that the spool of the ride valve 31B reaches the stroke amount.

The proportional control valve 56*b* supplies the pilot pressure corresponding to the signal of the controller 57*b* to the ride valve 31B. Accordingly, for example, the spool of the ride valve 31B moves to a stroke amount Lm in FIG. 11. The ride valve 31B reaches the connection position (D), and connects the accumulator 27 and the bottom chamber 11*a* of the boom cylinder 11 at the opening area An of the variable throttle 86. Further, the opening area Sc communicating the tank 23 and the head chamber 11*b* of the boom cylinder 11 is connected at the area Ar. Accordingly, the accumulator 27 and the bottom chamber 11*a* of the boom cylinder 11 are connected via the ride valve 31B at a uniform pressure.

As the opening area Sc communicating the tank 23 with the head chamber 11*b* of the boom cylinder 11, it is possible to sequentially increase the opening area Sc up to the area Ar according to an increase of a moving amount of the spool from the time T22 to the time T23 (to the time T24 in the two-dot chain line) as shown in FIG. 12E, that is, while the spool of the ride valve 31B transfers from the stroke amount L1 to the stroke amount Lm.

It is possible to travel in a state in which the opening area Sb and the opening area Sc in the ride valve 31B are switched to the area An and the area Ar controlled by the controller 57*b*. If the controller 57*b* inputs the travel state of the wheel loader 1 detected by the travel state detecting sensor 84, for example, vehicle speed information, it determines an optimum opening area Aw1 of the variable throttle 86 on a basis of the relation between the vehicle speed information and the opening area which is previously stored in a memory apparatus. In a case that the controller 57*b* determines that it is necessary to change the opening area of the variable throttle 86 from the state of the area An to the state of the area Aw1, it outputs a control signal so that the opening area of the variable throttle 86 becomes the area Aw1 to the proportional control valve 56*b*.

For example, if the controller 57*b* determines that the vehicle speed input from the travel state detecting sensor 84 is higher than a predetermined speed, it reduces the pilot pressure output from the proportional control valve 56*b*, and reduces the stroke amount of the spool of the ride valve 31B from Lm to Lms. Accordingly, as shown in FIG. 11, it is possible to change the opening area Sb of the variable throttle 86 connecting the accumulator 27 and the bottom chamber 11*a* of the boom cylinder 11 to the area Aws which is made further smaller from the state of the area An.

Further, in a case that the vehicle speed input from the travel state detecting sensor 84 is lower than the predetermined speed, the controller 57*b* increases the pilot pressure output from the proportional control valve 56*b*, and increases the stroke amount of the spool of the ride valve 31B from Lm to Lm1. Accordingly, it is possible to change the opening area Sb of the variable throttle 86 connecting the accumulator 27 and the bottom chamber 11*a* of the boom cylinder 11 to the state of the area Aw1 which is made larger from the state of the area An.

Accordingly, since it is possible to control the opening area Sb of the variable throttle 86, for example, to an area suitable for the vehicle speed and the load amount of the working apparatus 3, in the travel vibration suppressing device 20B, it is possible to optimally suppress the pressure pulsation generated in the bottom chamber 11*a* of the boom cylinder 11 according to the travel state and the load condition.

The pressure pulsation generated in the bottom chamber 11*a* can be suppressed by the accumulator 27 via the ride valve 31B in which the opening area Sb is set to the optimum area.

Further, for example, when the vehicle body 7 runs on a stone and ascends, the pressure in the bottom chamber 11*a* of the boom cylinder 11 is increased so that the boom 10 can stay at a height position where it was. At this time, it is possible to rapidly supply the increased pressure in the bottom chamber 11*a* to the accumulator 27 on the basis of the opening areas Sb and Sc in the ride valve 31B so as to absorb the increased pressure. Further, when the vehicle body 7 enters into a recess or the like and descends, it is possible to prevent the boom 10 from being pushed up by slowly supplying the pressure oil to the bottom chamber 11*a* of the boom cylinder 11 from the accumulator 27.

Further, the switching speed in the spool of the ride valve 31B can be freely set on a basis of the control current output to the proportional control valve 56*b* from the controller 57*b* according to the signals of the pressure sensor 81 and the travel state detecting sensor 84.

Fourth Embodiment

Figure 13:
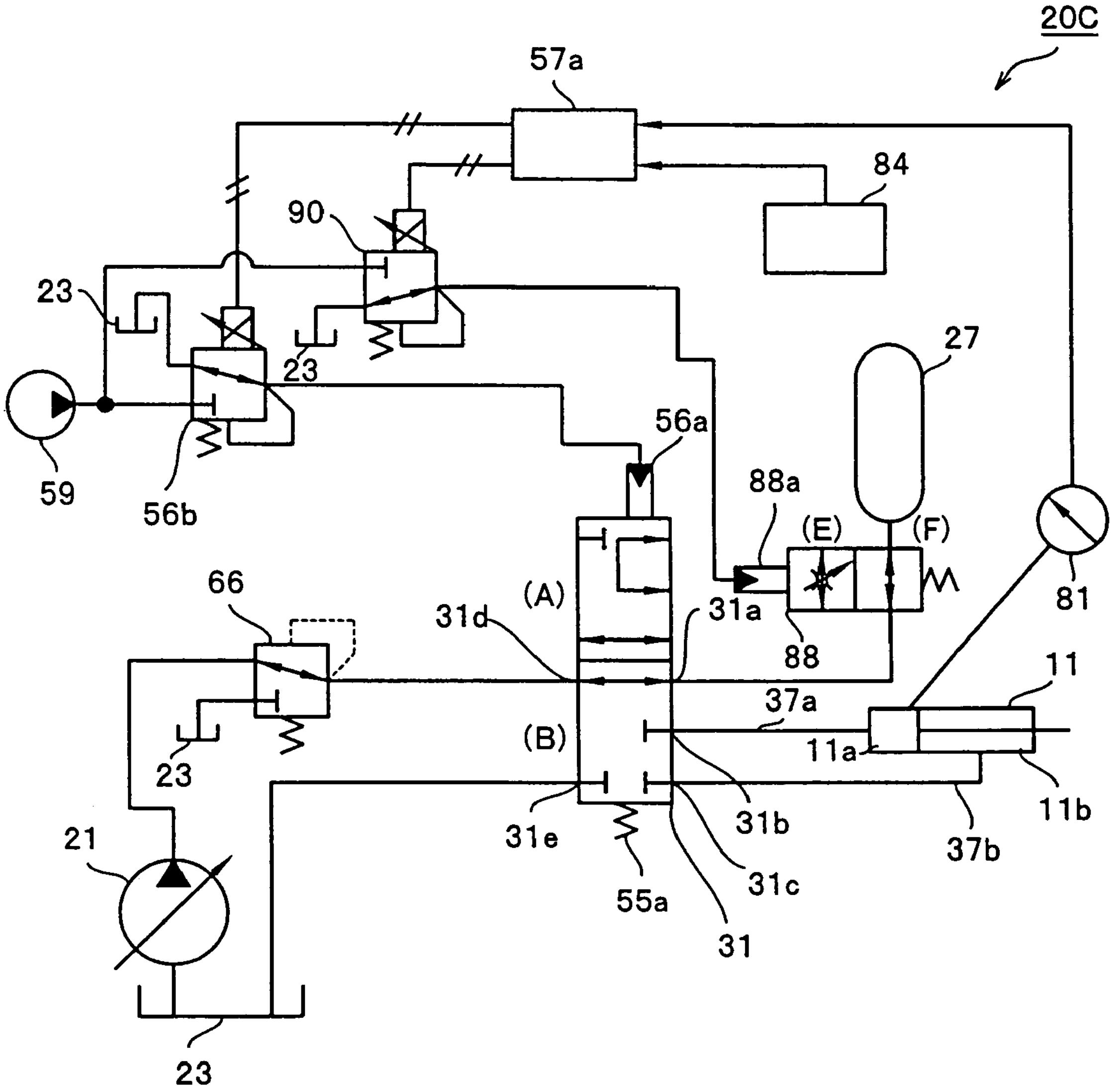
FIG. 13 is a circuit diagram of a third ride control valve and a control portion (fourth embodiment).
Figure 14:
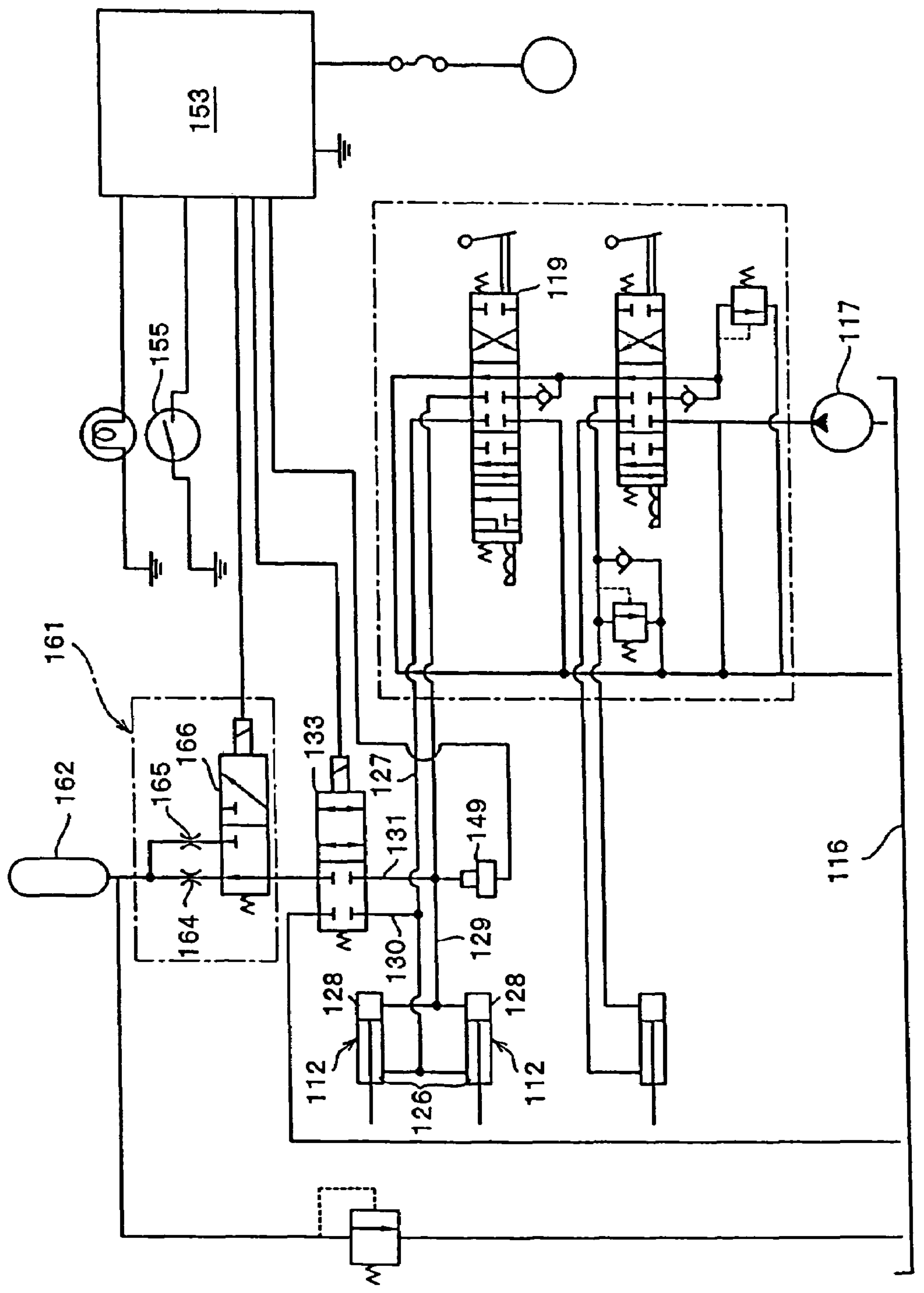
FIG. 14 PRIOR ART
FIG. 14 is a view showing a hydraulic circuit of a working apparatus (prior art).

Next, a description of a travel vibration suppressing device 20C in accordance with a fourth embodiment will be given. FIG. 13 shows a partial structure of the travel vibration suppressing device 20C. In the fourth embodiment, the structure at the connection position (D) of the ride valve 31B in the third embodiment is separated from the ride valve 31 so as to form an independent structure as a variable throttle valve 88. Further, a first proportional control valve 90 for controlling the variable throttle valve 88 is additionally arranged. Other structures are the same as the structures in the third embodiment. Accordingly, a description of the same parts as those in the first embodiment to the third embodiment will be omitted by attaching the same reference numerals thereto. FIG. 13 is shown while omitting the structures of the boom valve 29 and the speed increasing valve 33, for explaining the structure of the ride valve 31.

The variable throttle valve 88 is arranged between the accumulator 27 and the ride valve 31, and is actuated by receiving a pilot pressure from the first proportional control valve 90 to a control chamber 88*a*. The connection area between the accumulator 27 and the bottom chamber 11*a* of the boom cylinder 11 is made variable by the variable throttle valve 88. The variable throttle valve 88 is switched between a variable throttle position (E) at a time of receiving the pilot pressure from the first proportional control valve 90, and an open position (F) at a time of receiving no pilot pressure. When the variable throttle valve 88 is at the open position (F), the accumulator 27 and the hydraulic pump 21 are connected via the ride valve 31 so that the resistance is reduced so as to easily supply the discharge pressure oil from the hydraulic pump 21 to the accumulator 27.

The first proportional control valve 90 is controlled by receiving the control current from a controller 57*c*. The first proportional control valve 90 sets the variable throttle valve 88 to the variable throttle position (E) at a time of receiving the control current from the controller 57*c*, and controls the opening area of the variable throttle according to a control current value. Further, the first proportional control valve 90 is not actuated at a time when it does not receive the control current (at a time of a zero current), and sets the variable throttle valve 88 to the open position (F).

A description of an actuation of the ride valve 31 and the variable throttle valve 88 used in the travel vibration suppressing device 20C will be given by using a circuit diagram in FIG. 13. If the control current is output to the proportional control valve 56*b* from the controller 57*c* while being increased, a state in which the area is zero is maintained, after stroking the spool of the ride valve 31 as described in the first embodiment, gradually reducing the opening area Sa communicating the port 31*a* and the port 31*d*, and setting the area to zero (A0) from the state of A1.

If the spool of the ride valve 31 moves at a predetermined amount on a basis of the control current to the proportional control valve 56*b* from the third controller 57*c*, the opening area Sb communicating the port 31*a* and the port 31*b* is sequentially opened to the area A3. Further, it is possible to sequentially open the opening area Sc communicating the port 31*a* and the port 31*e* to the area A4, or it is possible to fully open to the area A4 at once.

The variable throttle valve 88 can change a throttle area to a maximum throttle opening at the variable throttle position (E) according to the control current with respect to the first proportional control valve 90 from the third controller 57*c*.

The controller 57*c* outputs the control current with respect to the first proportional control valve 90 on a basis of a relation between the detected values of both the sensors and the opening area previously stored in the memory apparatus by receiving the signals from the boom pressure sensor 81 and/or the travel state detecting sensor 84, and changes the throttle of the variable throttle valve 88 so as to obtain the optimum opening area corresponding to the detected values detected by both the sensors.

Accordingly, the accumulator 27 and the bottom chamber 1*a* of the boom cylinder 11 are connected via the opening area of the throttle in the variable throttle valve 88 and the opening area Sb communicating the port 31*a* and the port 31*b* in the ride valve 31. Further, at this time, the opening area Sc in the ride valve 31 communicating the tank 23 and the head chamber 11*b* of the boom cylinder 11 becomes a constant area A4, and increases the supply and discharge amount of the pressure oil between the tank 23 and the boom cylinder 11 so as to prevent a vacuum from being generated.

Accordingly, the opening area communicating the accumulator 27 and the bottom chamber 11*a* of the boom cylinder 11 can be controlled over two stages.

For example, in a case that the load weight detected from the boom pressure sensor 81 is large, and in a case that the vehicle speed detected from the travel state detecting sensor 84 is high, the controller 57*c* outputs a great control current to the first proportional control valve 90 so as to make the opening area of the variable throttle valve 88 small and fasten the throttle.

On the contrary, in a case that the load weight is small, and in a case that the vehicle speed is low, the controller 57*c* outputs a small control current to the first proportional control valve 90 so as to make the opening area of the variable throttle valve 88 large and loosen the throttle.

Next, a description of the actuation of the travel vibration suppressing device 20C will be given by using a transferring work of the wheel loader 1. However, since it is possible to execute approximately the same actuation as that of the case in the third embodiment, a description of a different actuation from the case of the third embodiment at a time when the wheel loader 1 travels will be given.

If the operator turn on the switch (not shown) at a time of traveling, the controller 57*c* outputs the control signal to the proportional control valve 56*b*, and moves the ride valve 31 at a full stroke so as to be set to the actuated position (A). Further, the controller 57*c* inputs the pressure Pb in the bottom chamber 11*a* detected by the boom pressure sensor 81, and outputs the control current to the first proportional control valve 90 by using the control current for obtaining the opening area of the variable throttle valve 88 with respect to the pressure Pb which is previously determined on a basis of tests or the like and is stored.

The first proportional control valve 90 which received the control current applies the pilot pressure set to the predetermined pressure to the variable throttle valve 88, and sets the opening area of the variable throttle to the predetermined opening area. The accumulator 27 and the bottom chamber 11*a* of the boom cylinder 11 are connected via the throttle set to the predetermined opening area.

Accordingly, the accumulator 27 and the bottom chamber 11*a* of the boom cylinder 11 are connected via the opening area Sb in the ride valve 31 and the opening area of the variable throttle valve 88 so as to be at a uniform pressure.

Next, the wheel loader 1 travels, and the controller 57*c* inputs, for example, the information of the vehicle speed from the travel state detecting sensor 84. At this time, if the opening area difference between both the variable throttles is large as a result of comparing the opening area of the variable throttle obtained from the relation between the vehicle speed information which is previously stored in the memory apparatus and the opening are a with the opening area of the variable throttle which is set according to the detected pressure from the boom pressure sensor 81, the control current is output to the first proportional control valve 90, and the throttle of the variable throttle valve 88 is changed to the optimum opening area.

For example, if the controller 57*c* receives information that the vehicle speed is high from the travel state detecting sensor 84, the throttle is fastened so that the opening area is made further smaller by narrowing the throttle of the variable throttle valve 88 connecting the accumulator 27 and the bottom chamber 11*a* of the boom cylinder 11.

Further, in a case that the controller 57*c* receives the information that the vehicle speed is low, the controller 57*c* outputs the control signal of making the opening area of the throttle of the variable throttle valve 88 large to the first proportional control valve 90. After the first proportional control valve 90 receives the control signal from the controller 57*c*, it can control the pilot pressure large or small so as to set the opening area of the throttle in the variable throttle valve 88 to the opening area according to the detected signal from the travel state detecting sensor 84.

Accordingly, in the travel vibration suppressing device 20C, the pressure pulsation of the boom cylinder 11 generated by the travel of the wheel loader 1 can be absorbed by the accumulator 27 via the variable throttle valve 88 and the ride valve 31 as the opening area matching to the detected signal from the boom pressure sensor 81 and/or the travel state detecting sensor 84.

In each of the embodiments mentioned above, the description is given on a basis of an example in which the accumulator 27 and the bottom chamber 11*a* of the boom cylinder 11 are connected, however, even if a structure is made such that the accumulator 27 and the head chamber 11*b* of the boom cylinder 11 are connected, it is possible to effectively function the travel vibration suppressing device in accordance with the present invention.

Further, the description of the ride valve 31 is given by using a two-position switching valve or a three-position switching valve for making the description easy, however, it is possible to use a continuously changing servo valve.

Further, the description of the directional control valve 24 is given on a basis of a structure in which the boom valve 29 and the speed increasing valve 33 are arranged in both sides of the ride valve 31, however, the structure is not limited to this, but the ride valve 31 and the speed increasing valve 33 may be arranged in both sides of the boom valve 29.

Further, the change of the opening area between the accumulator 27 and the boom cylinder 11 is shown by the straight line, however, it may be changed in accordance with a curve such as a secondary parabola or the like.

In the above description, the structure in which the directional control valve employs two directional control valves comprising the boom valve 29 and the bucket valve 30, the boom valve 29 of the boom directional control valve is arranged in a pump side, and the bucket valve 30 is arranged in adjacent thereto. However, an arrangement structure of the directional control valve is not limited to this, for example, a structure may be made such that the directional control valve comprises three or more directional control valves, the bucket valve 30 is arranged in the pump side, and one of the remaining directional control valves is set as the boom valve 29 of the boom directional control valve.

Further, the travel vibration suppressing device can be structured by appropriately combining the first embodiment to the fourth embodiment.

INDUSTRIAL APPLICABILITY

The travel vibration suppressing device in accordance with the present invention can be utilized with respect to a structure in which a pressure pulsation is generated by a vibration during travel of a traveling vehicle.

The invention claimed is:

1. A travel vibration suppressing device disposed in a working vehicle, the travel vibration suppressing device absorbing a pressure pulsation generated in an actuator when the working vehicle is traveling, and comprising:

a hydraulic pump;

at least one actuator having a pressure chamber and being actuated by pressure oil discharged from the hydraulic pump;

an accumulator connected to the pressure chamber in the at least one actuator for absorbing a pressure pulsation generated in the pressure chamber;

a directional control valve for controlling a supply and a discharge of the pressure oil to the at least one actuator; and a ride control valve for switching a communicating state and a cutout state between the accumulator and the pressure chamber, the cutout state being a state in which flow of pressure oil through the ride control valve to and from the accumulator and the pressure chamber is prevented, wherein the ride control valve is located in a ride valve body, the directional control valve is located in a directional control valve body, the ride valve body is disposed on the directional control valve body in a laminated manner, the ride control valve and the directional control valve are connected through an internal piping in the ride valve body and the directional control valve body, the travel vibration suppressing device comprises a first pressure sensor for detecting a load pressure of the at least one actuator, a communication opening area of the ride control valve which communicates between the accumulator and the pressure chamber is controlled on a basis of a detected signal from the first pressure sensor, and the communication opening area is relatively small when a load pressure detected by the first pressure sensor is a relatively high load pressure and the communication opening area is relatively large when a load pressure detected by the first pressure sensor is a relatively low load pressure.

2. The travel vibration suppressing device according to claim 1, comprising a second pressure sensor for detecting a pressure of an accumulator, wherein a switching position of the ride control valve is controlled by a detected pressure of the accumulator detected by the second pressure sensor and the load pressure of the actuator detected by the first pressure sensor, when the detected pressure detected by the second pressure sensor is higher than the pressure detected by the first pressure sensor, the ride control valve is switched to a position where the accumulator is connected to a tank, and when the detected pressure detected by the second pressure sensor becomes equivalent to the load pressure of the actuator from a state in which the detected pressure detected by the second pressure sensor is higher than the pressure detected by the first pressure sensor, the ride control valve is switched to a position where the accumulator is communicated with the pressure chamber.

3. The travel vibration suppressing device according to claim 1, further comprising a speed increasing valve for increasing a supply amount of the pressure oil from the hydraulic pump to the actuator, wherein the speed increasing valve is located in a speed increasing valve body, and the speed increasing valve and the ride control valve or the directional control valve are connected through the internal piping in each body and/or an external piping outside of each body.

4. The travel vibration suppressing device according to claim 1, wherein the directional control valve is located in a directional control valve body for a boom of the working vehicle.

5. A travel vibration suppressing device disposed in a working vehicle, the travel vibration suppressing device absorbing a pressure pulsation generated in an actuator when the working vehicle is traveling, and comprising:

a hydraulic pump;

at least one actuator having a pressure chamber and being actuated by pressure oil discharged from the hydraulic pump;

an accumulator connected to the pressure chamber in the at least one actuator for absorbing a pressure pulsation generated in the pressure chamber;

a directional control valve for controlling a supply and a discharge of the pressure oil to the at least one actuator; and a ride control valve for switching a communicating state and a cutout state between the accumulator and the pressure chamber, the cutout state being a state in which flow of pressure oil through the ride control valve to and from the accumulator and the pressure chamber is prevented, wherein the ride control valve is located in a ride valve body, the directional control valve is located in a directional control valve body, the ride valve body is disposed on the directional control valve body in a laminated manner, the ride control valve and the directional control valve are connected through an internal piping in the ride valve body and the directional control valve body, the travel vibration suppressing device comprises a first pressure sensor for detecting a load pressure of the at least one actuator, and a travel state detecting sensor for detecting a travel state of the working vehicle, wherein a communication opening area of the ride control valve which communicates between the accumulator and the pressure chamber is controlled based on at least any one of the load pressure of the actuator detected by the first pressure sensor and the travel state of the working vehicle detected by the travel state detecting sensor, and wherein, when an increase of the load pressure of the actuator is detected by the first pressure sensor and/or when an increase of a traveling speed of the working vehicle is detected by the travel state detecting sensor, the communication opening area becomes smaller than an upper limit of the communication opening area.

6. The travel vibration suppressing device according to claim 5, wherein the directional control valve is located in a directional control valve body for a boom of the working vehicle.

7. A travel vibration suppressing device disposed in a working vehicle, the travel vibration suppressing device absorbing a pressure pulsation generated in an actuator when the working vehicle is traveling, and comprising;

a hydraulic pump;

at least one actuator actuated by pressure oil discharged from the hydraulic pump;

an accumulator connected to a pressure chamber in the at least one actuator for absorbing a pressure pulsation generated in the pressure chamber;

a directional control valve for controlling a supply and a discharge of the pressure oil to the at least one actuator; and a ride control valve for switching a communicating state and a cutoff state between the accumulator and the pressure chamber, wherein the ride control valve is located in a ride valve body, the directional control valve is located in a directional control valve body, the ride valve body is disposed on the directional control valve body in a laminated manner, the ride control valve and the directional control valve are connected through an internal piping in the ride valve body and the directional control valve body, the travel vibration suppressing device comprises a speed increasing valve for increasing a supply amount of the pressure oil from the hydraulic pump to the at least one actuator, the speed increasing valve is located in a speed increasing valve body, the speed increasing valve is disposed on the ride valve body or the directional control valve body in a laminated manner, and the speed increasing valve and the ride control valve or the directional control valve are connected through the internal piping in each body and/or an external piping outside of each body.

8. The travel vibration suppressing device according to claim 7, wherein the directional control valve is located in a directional control valve body for a boom.

* * * * *